US012067025B2

(12) United States Patent
Chowdhury et al.

(10) Patent No.: US 12,067,025 B2
(45) Date of Patent: Aug. 20, 2024

(54) SYSTEM AND METHOD FOR UNIVERSAL FORMAT DRIVEN DATA TRANSFORMATION AND KEY FLEX FIELDS IN AN ANALYTIC APPLICATIONS ENVIRONMENT

(71) Applicant: ORACLE INTERNATIONAL CORPORATION, Redwood Shores, CA (US)

(72) Inventors: Saugata Chowdhury, Sunnyvale, CA (US); Jagdish Chand, Dublin, CA (US); Ispati Nautiyal, Bangalore (IN); Saurav Mohapatra, Hyderabad (IN); Akshay Satyendranath, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/855,933

(22) Filed: Jul. 1, 2022

(65) Prior Publication Data

US 2022/0342897 A1    Oct. 27, 2022

Related U.S. Application Data

(63) Continuation of application No. 16/852,069, filed on Apr. 17, 2020, now Pat. No. 11,379,496.

(30) Foreign Application Priority Data

Apr. 18, 2019  (IN) .............................. 201941015561
Apr. 18, 2019  (IN) .............................. 201941015564

(51) Int. Cl.
G06F 16/25    (2019.01)
G06F 16/11    (2019.01)

(52) U.S. Cl.
CPC .......... G06F 16/254 (2019.01); G06F 16/116 (2019.01)

(58) Field of Classification Search
CPC ............................. G06F 16/254; G06F 16/116
See application file for complete search history.

(56) References Cited

U.S. PATENT DOCUMENTS 7,058,615 B2    6/2006  Yao
8,150,744 B2    4/2012  Zoldi
(Continued)

OTHER PUBLICATIONS

United States Patent and Trademark Office, Office Communication dated Sep. 15, 2023 for U.S. Appl. No. 17/883,471, 6 pages.
(Continued)

*Primary Examiner* — Mariela Reyes
*Assistant Examiner* — Courtney Harmon
(74) *Attorney, Agent, or Firm* — TUCKER ELLIS LLP

(57) ABSTRACT

Systems and methods for providing a universal format driven data transformation. In conventional ETL operations, the transform process that transforms data from the source format to the destination format is based on a transformation program. Conventionally, transform logic is developed around the chosen transform program. In accordance with an embodiment, a universal, format-driven data transform can be achieved through the use of a data transformation format. In accordance with an embodiment, a method for providing a universal format driven data transformation can include providing a transformation format in a file, wherein the transformation format is in a human-readable form; and providing, in the transformation format, keywords defining a target table type, a dataset list, and dataset operations to be performed on a dataset from the dataset list.

16 Claims, 19 Drawing Sheets

(56) References Cited

U.S. PATENT DOCUMENTS

| | | |
|---|---|---|
| 8,554,801 B2 | 10/2013 | Mack |
| 8,799,209 B2 | 8/2014 | Bakalash |
| 9,152,662 B2 | 10/2015 | Bhide |
| 9,355,145 B2 | 5/2016 | George |
| 9,442,993 B2 | 9/2016 | Tung |
| 9,483,537 B1 * | 11/2016 | Peters ................ G06F 16/254 |
| 9,619,535 B1 | 4/2017 | Kapoor |
| 9,961,011 B2 | 5/2018 | Mordani |
| 9,990,408 B2 | 6/2018 | Sekar |
| 10,019,451 B2 | 7/2018 | Preslan |
| 10,110,390 B1 | 10/2018 | Nguyen |
| 10,296,880 B2 | 5/2019 | Miller |
| 10,324,932 B2 | 6/2019 | Gordon |
| 10,552,443 B1 | 2/2020 | Wu |
| 10,572,679 B2 | 2/2020 | Frank |
| 10,713,609 B1 | 7/2020 | Kapoor |
| 10,795,895 B1 | 10/2020 | Taig |
| 10,803,394 B2 | 10/2020 | Costabello |
| 10,997,129 B1 | 5/2021 | Nanda |
| 11,062,249 B2 | 7/2021 | Bower |
| 11,190,599 B2 | 11/2021 | Greenstein |
| 11,194,795 B2 | 12/2021 | Muralidhar |
| 11,243,919 B2 | 2/2022 | Bartlett |
| 11,379,496 B2 | 7/2022 | Chowdhury |
| 2004/0215584 A1 | 10/2004 | Yao |
| 2008/0162509 A1 | 7/2008 | Becker |
| 2009/0076866 A1 | 3/2009 | Zoldi |
| 2011/0231454 A1 | 9/2011 | Mack |
| 2012/0054249 A1 * | 3/2012 | Batra ................ G06F 16/283 |
| | | 707/805 |
| 2012/0089564 A1 | 4/2012 | Bakalash |
| 2012/0191642 A1 | 7/2012 | George |
| 2012/0310875 A1 | 12/2012 | Prahlad |
| 2013/0086121 A1 | 4/2013 | Preslan |
| 2013/0185309 A1 | 7/2013 | Bhide |
| 2014/0229511 A1 | 8/2014 | Tung |
| 2015/0207758 A1 | 7/2015 | Mordani |
| 2016/0071036 A1 | 3/2016 | Bower |
| 2016/0224803 A1 | 8/2016 | Frank |
| 2016/0328566 A1 | 11/2016 | Nellamakkada |
| 2017/0109418 A1 | 4/2017 | Bartlett |
| 2017/0132300 A1 | 5/2017 | Sekar |
| 2017/0249361 A1 | 8/2017 | Gordon |
| 2018/0144314 A1 * | 5/2018 | Miller ................ G06Q 20/405 |
| 2019/0042988 A1 * | 2/2019 | Brown ............... G06F 16/9535 |
| 2019/0287006 A1 | 9/2019 | Costabello |
| 2020/0007631 A1 | 1/2020 | Greenstein |
| 2020/0334240 A1 | 10/2020 | Muralidhar |
| 2020/0334269 A1 | 10/2020 | Chowdhury |
| 2021/0342341 A1 | 11/2021 | Fujimaki |

OTHER PUBLICATIONS

United States Patent and Trademark Office, Notice of Allowance and Fee(s) Due dated Jul. 26, 2023 for U.S. Appl. No. 16/851,869, 9 pages.

United States Patent and Trademark Office, Office Communication dated Aug. 23, 2023 for U.S. Appl. No. 16/920,574 , 16 pages.

Ramesh, S. M. and Gomathy, B. "Review on Scheduling Algorithms for Data Warehousing" International Journal of Science and Research (IJSR), vol. 3 Issue 9, Sep. 2014, 6 pages.

United States Patent and Trademark Office, Office Communication dated Nov. 28, 2023 for U.S. Appl. No. 17/076,164 , 30 pages.

United States Patent and Trademark Office, Office Communication dated Nov. 7, 2023 for U.S. Appl. No. 18/137,306 , 20 pages.

* cited by examiner

SYSTEM AND METHOD FOR UNIVERSAL FORMAT DRIVEN DATA TRANSFORMATION AND KEY FLEX FIELDS IN AN ANALYTIC APPLICATIONS ENVIRONMENT

CLAIM OF PRIORITY AND CROSS REFERENCE TO RELATED APPLICATIONS

This application is a continuation of U.S. Patent Application titled "SYSTEM AND METHOD FOR UNIVERSAL FORMAT DRIVEN DATA TRANSFORMATION AND KEY FLEX FIELDS IN AN ANALYTIC APPLICATIONS ENVIRONMENT", application Ser. No. 16/852,069, filed Apr. 17, 2020, which claims the benefit of priority to India Patent Application No. 201941015561 entitled "SYSTEM AND METHOD FOR UNIVERSAL FORMAT DRIVEN DATA TRANSFORMATION", filed on Apr. 18, 2019, and to India Patent Application No. 201941015564 entitled "SYSTEM AND METHOD FOR USE OF KEY FLEX FIELDS IN AN ANALYTICS ENVIRONMENT", filed on Apr. 18, 2019, each of which above applications are herein incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, and business intelligence, and are particularly related to systems and methods for providing an application analytics environment that enables the development of software analytic applications.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

In traditional systems, extract, transform, and load processes can be burdensome on the users and/or administrators to manage. This is due to the possibility of extract, transform, load (ETL) failing whenever there is bad data within the source. Systems and frameworks have been developed that allow ETLs to continue unabated, or correct erroneous/bad data in the source that would prevent ETLs from failing, but these have costs associated with them. As well, such fixes generally require the use of a temporary table so that the user/administrator running the ETL can perform checks on the tables and then load the valid records to the target. Such processes are time and resource intensive, and thus undesirable.

SUMMARY

In accordance with an embodiment, an analytic applications environment enables data analytics within the context of an organization's enterprise software application or data environment, or a software-as-a-service or other type of cloud environment; and supports the development of computer-executable software analytic applications.

A data pipeline or process, such as, for example an extract, transform, load process, can operate in accordance with an analytic applications schema adapted to address particular analytics use cases or best practices, to receive data from a customer's (tenant's) enterprise software application or data environment, for loading into a data warehouse instance.

Each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

Described herein are systems and methods for providing a universal format (UF) driven data transformation. In conventional ETL operations, the transform process that transforms data from the source format to the destination format is based on a transformation program. Conventionally, transform logic is developed around the chosen transform program.

In accordance with an embodiment, a universal, format-driven data transform can be achieved through the use of a data transformation format. In accordance with an embodiment, a method for providing a universal format driven data transformation can include providing a transformation format in a file, wherein the transformation format is in a human-readable form; and providing, in the transformation format, keywords defining a target table type, a dataset list, and dataset operations to be performed on a dataset from the dataset list.

Described herein are systems and methods for use of key flex fields (KFF) in an analytics environment. In accordance with an embodiment, customers of a cloud computing environment may have different data structures. Dynamic reporting from a data warehouse service of the cloud environment would be beneficial, however, fields must be flexible in order to map different data models to common reports. In accordance with an embodiment, a method for key flex field design, can include extracting segment label names, corresponding segment numbers, value sets and data values from a transactional data environment; joining the segment label names, corresponding segment numbers, and value sets to form a first joined table; joining the first joined table with the data values to form a second joined data table; and dynamically create reports for multiple customers based on the second joined table.

BRIEF DESCRIPTION OF THE DRAWINGS

FIG. 14 shows an interface for editing key flex field segments of a GL Accounting KFF, in accordance with an embodiment.

FIG. 15 shows an exemplary interface for managing segment mappings, in accordance with an embodiment.

FIG. 16 shows an example of a table derived with a correct grain, in accordance with an embodiment.

DETAILED DESCRIPTION

Figure 1:
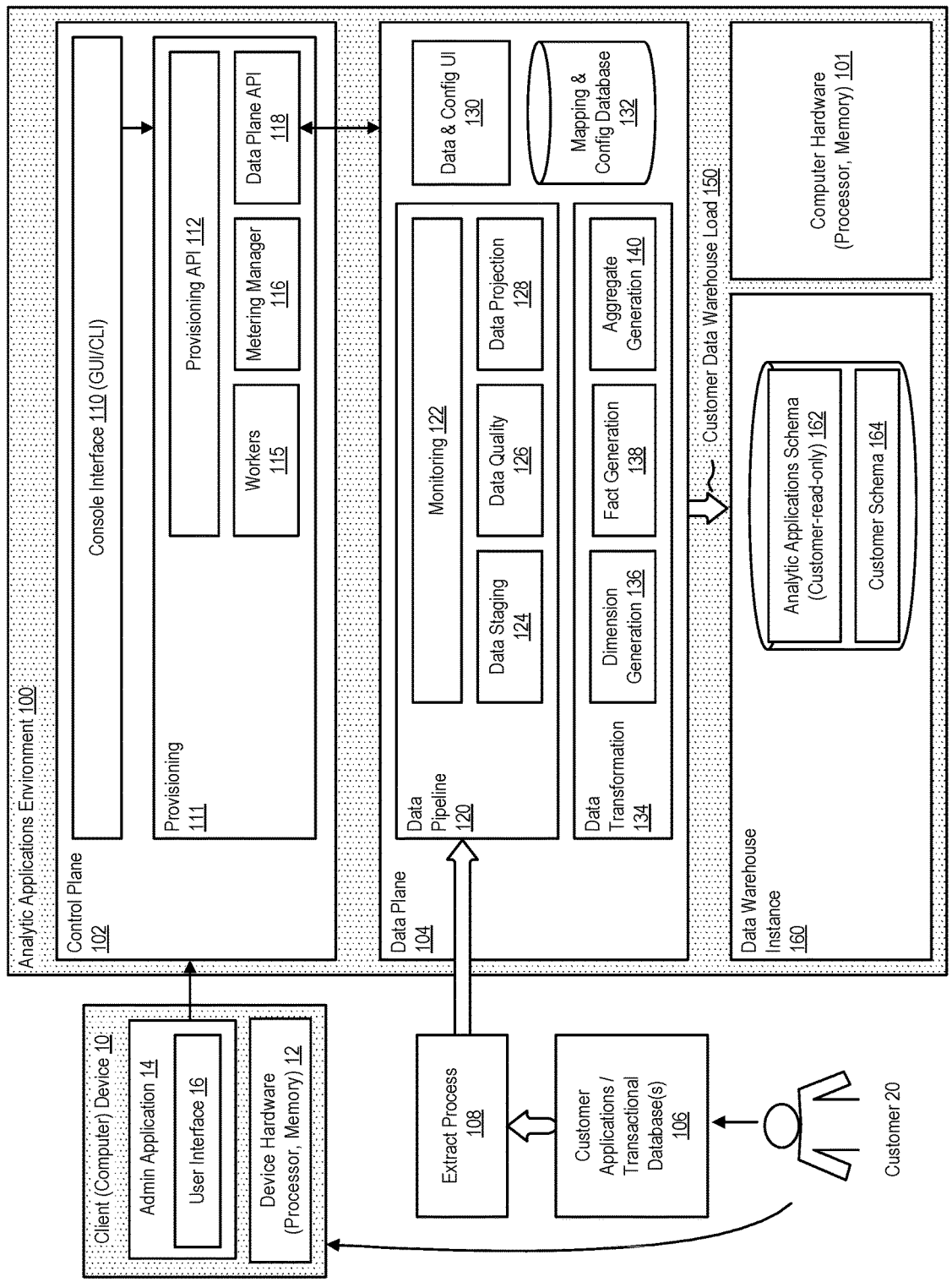
FIG. 1 illustrates a system for providing an analytic applications environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

In accordance with an embodiment, an analytic applications environment enables data analytics within the context of an organization's enterprise software application or data environment, or a software-as-a-service or other type of cloud environment; and supports the development of computer-executable software analytic applications.

A data pipeline or process, such as, for example an extract, transform, load process, can operate in accordance with an analytic applications schema adapted to address particular analytics use cases or best practices, to receive data from a customer's (tenant's) enterprise software application or data environment, for loading into a data warehouse instance.

Each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

A technical advantage of the described systems and methods includes that the use of a system-wide or shared analytic applications schema or data model, maintained within an analytic applications environment (cloud) tenancy; together with tenant-specific customer schemas, maintained within customer tenancies; enables each customer's (tenant's) data warehouse instance, or database tables, to be populated or otherwise associated with live data (live tables), as received from their enterprise software application or data environment, on an automated or a periodic, e.g., hourly/daily/weekly, or other basis, and reflecting best practices for particular analytics use cases. Examples of such analytics use cases include Enterprise Resource Planning (ERP), Human Capital Management (HCM), Customer Experience (CX), Supply Chain Management (SCM), Enterprise Performance Management (EPM), or other types of analytics use cases. The populated data warehouse instance or database tables can then be used to create computer-executable software analytic applications, or to determine data analytics or other information associated with the data.

In accordance with an embodiment, a computer-executable software analytic application can be associated with a data pipeline or process, such as, for example an extract, transform, load (ETL) process, or an extract, load, transform (ELT) process, maintained by a data integration component, such as, for example, an Oracle Data Integrator (ODI) environment, or other type of data integration component.

In accordance with an embodiment, the analytic applications environment can operate with a data warehouse component, such as, for example an Oracle Autonomous Data Warehouse Cloud (ADWC) environment, or other type of data warehouse component adapted to store large amounts of data; which can be populated via a star schema sourced from an enterprise software application or data environment, such as, for example, an Oracle Fusion Applications, or other type of enterprise software application or data environment. The data made available to each customer (tenant) of the analytic applications environment can be provisioned in an ADWC tenancy that is associated with, and accessible only to, that customer (tenant); while providing access to other features of a shared infrastructure.

For example, in accordance with an embodiment, the analytic applications environment can include a data pipeline or process layer that enables a customer (tenant) to ingest data extracted from their Oracle Fusion Applications environment, to be loaded into a data warehouse instance within their ADWC tenancy, including support for features such as multiple data warehouse schemas, data extract and target schemas, and monitoring of data pipeline or process stages; coupled with a shared data pipeline or process infrastructure that provides common transformation maps or repositories.

Introduction

In accordance with an embodiment, a data warehouse environment or component, such as, for example an Oracle Autonomous Data Warehouse Cloud (ADWC) environment, or other type of data warehouse component adapted to store large amounts of data, can provide a central repository for storage of data collected by one or more business applications.

For example, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example an Oracle Business Intelligence Applications (OBIA) environment, or other type of BI component adapted to examine large amounts of data sourced either by the customer (tenant) itself, or from multiple third-party entities.

For example, when used with a SaaS business productivity software product suite that includes a data warehouse component, the analytic applications environment can be used to populate the data warehouse component with data from the business productivity software applications of the suite. Predefined data integration flows can automate the ETL processing of data between the business productivity software applications and the data warehouse, which processing might have been conventionally or manually performed by the users of those services.

As another example, the analytic applications environment can be pre-configured with database schemas for storing consolidated data sourced across various business productivity software applications of a SaaS product suite. Such pre-configured database schemas can be used to provide uniformity across the productivity software applications and corresponding transactional databases offered in the SaaS product suite; while allowing the user to forgo the process of manually designing, tuning, and modeling the provided data warehouse.

As another example, the analytic applications environment can be used to pre-populate a reporting interface of a data warehouse instance with relevant metadata describing business-related data objects in the context of various business productivity software applications, for example to include predefined dashboards, key performance indicators (KPIs), or other types of reports.

Analytic Applications Environment

FIG. 1 illustrates a system for providing an analytic applications environment, in accordance with an embodiment.

As illustrated in FIG. 1, in accordance with an embodiment, an analytic applications environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

The components and processes illustrated in FIG. 1, and as further described herein with regard to various other embodiments, can be provided as software or program code executable by a computer system or other type of processing device.

For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example an Oracle Analytics Cloud or Oracle Cloud Infrastructure environment, or other type of cloud environment.

For example, the control plane can include a console interface 110 that enables access by a client computer device 10 having a device hardware 12, administrative application 14, and user interface 16, under control of a customer (tenant) 20 and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants).

For example, the console interface can provide interfaces that allow customers to provision services for use within their SaaS environment, and to configure those services that have been provisioned.

In accordance with an embodiment, the provisioning component can include various functionality to provision services that are specified by provisioning commands.

For example, the provisioning component can be accessed and utilized, via the console interface, by a customer (tenant) to purchase one or more of a suite of business productivity software applications, together with a data warehouse instance for use with those software applications.

A customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

The provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane.

For example, provisioning and configuration changes directed to services provided by the data plane can be communicated to the data plane via the data plane API.

In accordance with an embodiment, the metering manager can include various functionality that meters services and usage of services provisioned through control plane.

For example, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

To support multiple tenants, the system can enable the use of multiple data warehouses or data warehouse instances.

For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data.

For example, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset includes no dependencies on any other model data set; and a second model data set includes dependencies to the first model data set; then the monitoring component can determine to transform the first data set before the second data set, to accommodate the second data set's dependencies on the first data set.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

For example, dimensions can include categories of data such as, for example, "name," "address," or "age". Fact generation includes the generation of values that data can take, or "measures." Facts are associated with appropriate dimensions in the data warehouse instance. Aggregate generation includes creation of data mappings which compute aggregations of the transformed data to existing data in the customer schema 164 of data warehouse instance.

In accordance with an embodiment, once any transformations are in place (as defined by the data model), the data pipeline or process can read the source data, apply the transformation, and then push the data to the data warehouse instance.

Data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Horizontally and vertically integrated business software applications are generally directed to capturing of data in real time. This is a result of horizontally and vertically integrated business software applications being generally used for daily workflow, and storing data in a transactional database, which means that only the most current data is generally stored in such databases.

For example, while a HCM application might update a record associated with an employee when the employee transfers offices, such HCM application would generally not maintain a record of each office that the employee had worked in during their tenure with a company. As such, a BI-related query seeking to determine employee mobility within a company would not have adequate records within the transaction database to complete such a query.

In accordance with an embodiment, by storing historical, in addition to current data, generated by the horizontally and vertically integrated business software applications, in a context that is readily understandable by BI applications, the data warehouse instance as populated using the above technique provides a resource for BI applications to process such queries, using an interface provided, for example, by a business productivity and analytics product suite, or by a SQL tool of the customer's choice.

Data Pipeline Process

Figure 2:
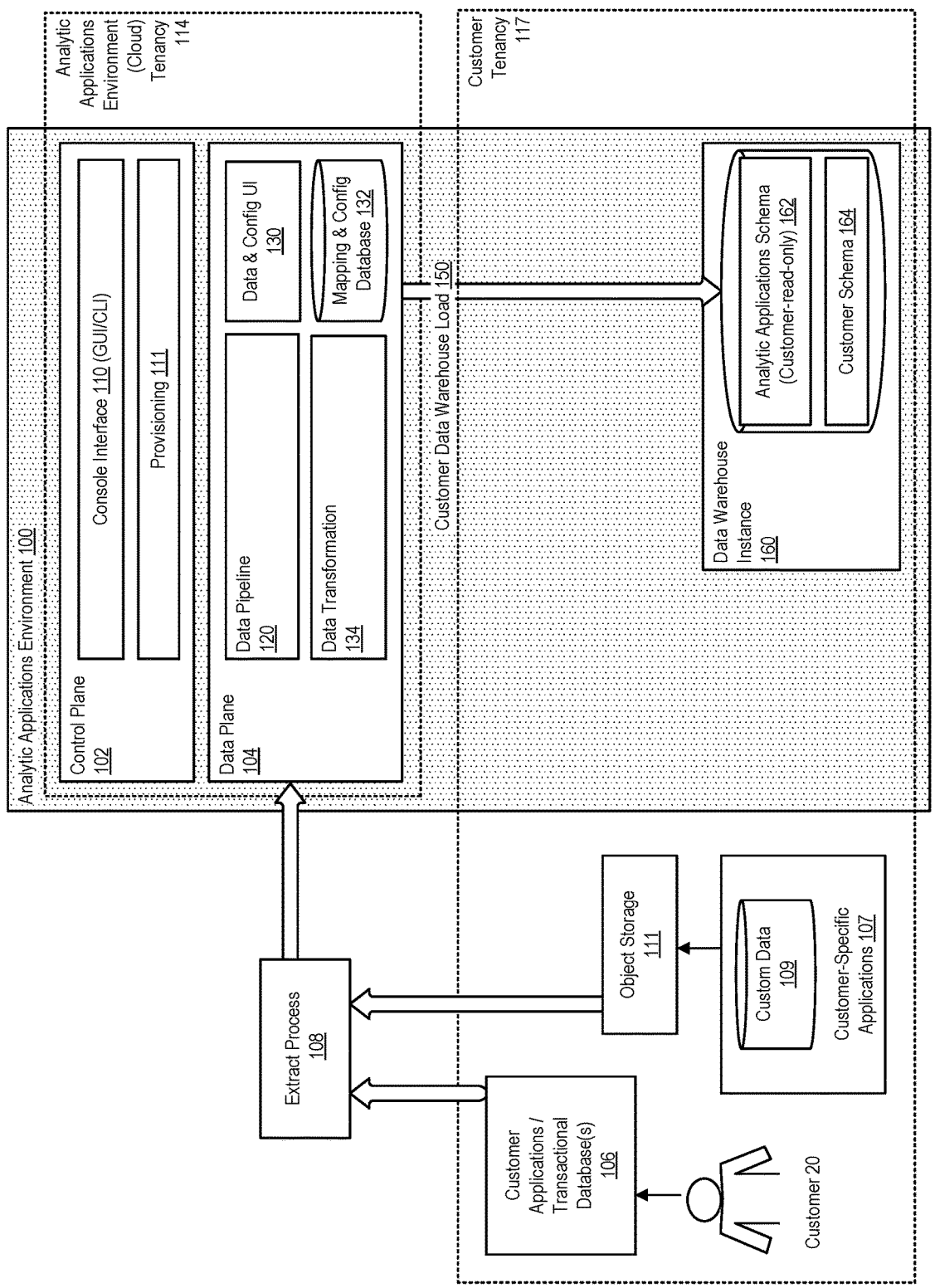
FIG. 2 further illustrates a system for providing an analytic applications environment, in accordance with an embodiment.

FIG. 2 further illustrates a system for providing an analytic applications environment, in accordance with an embodiment.

As illustrated in FIG. 2, in accordance with an embodiment, data can be sourced, e.g., from a customer's (tenant's) enterprise software application or data environment (106), using the data pipeline process as described above; or as custom data 109 sourced from one or more customer-specific applications 107; and loaded to a data warehouse instance, including in some examples the use of an object storage 105 for storage of the data.

In accordance with an embodiment, the data pipeline or process maintains, for each customer (tenant), an analytic applications schema, e.g., as a star schema, that is updated on a periodic or other basis, by the system in accordance with best practices for a particular analytics use case, e.g., human capital management (HCM) analytics, or enterprise resource planning (ERP) analytics.

In accordance with an embodiment, for each customer (tenant), the system uses the analytic applications schema that is maintained and updated by the system, within an analytic applications environment (cloud) tenancy 114, to pre-populate a data warehouse instance for the customer, based on an analysis of the data within that customer's enterprise applications environment, and within a customer tenancy 117. As such, the analytic applications schema maintained by the system enables data to be retrieved, by the data pipeline or process, from the customer's environment, and loaded to the customer's data warehouse instance in a "live" manner.

In accordance with an embodiment, the analytic applications environment also provides, for each customer of the environment, a customer schema that is readily modifiable by the customer, and which allows the customer to supplement and utilize the data within their own data warehouse instance. For each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics For example, in accordance with an embodiment, a data warehouse (e.g., an Oracle Autonomous Data Warehouse, ADWC) can include an analytic applications schema and, for each customer/tenant, a customer schema sourced from their enterprise software application or data environment. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

For a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Extraction, Transformation, Load/Publish

Figure 3:
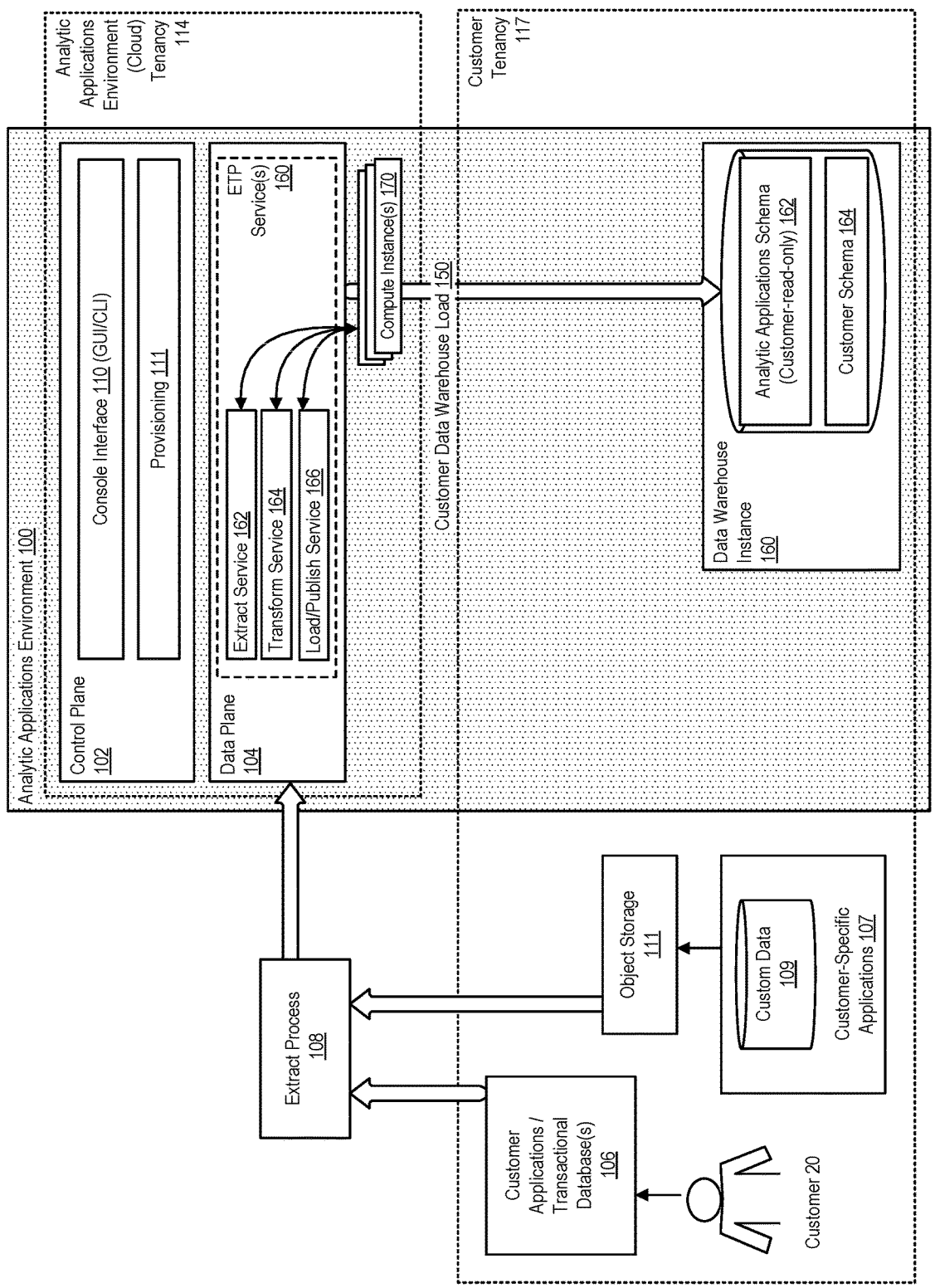
FIG. 3 further illustrates a system for providing an analytic applications environment, in accordance with an embodiment.

FIG. 3 further illustrates a system for providing an analytic applications environment, in accordance with an embodiment.

As illustrated in FIG. 3, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

Extraction: in accordance with an embodiment, a list of view objects for extractions can be submitted, for example, to an Oracle BI cloud connector (BICC) component via a ReST call. The extracted files can be uploaded to an object storage component, for example an Oracle Storage Service (OSS) component, for storage of the data.

Transformation: In accordance with an embodiment, the transformation process takes the data files from object storage component (e.g., OSS), and applies a business logic while loading them to a target data warehouse, e.g., ADWC database, which is internal to the data pipeline or process, and is not exposed to the customer (tenant).

Load/Publish: In accordance with an embodiment, a load/publish service or process takes the data from the, e.g., IADW warehouse, and publishes it to a data warehouse instance that is accessible to the customer (tenant).

Multiple Customers (Tenants)

Figure 4:
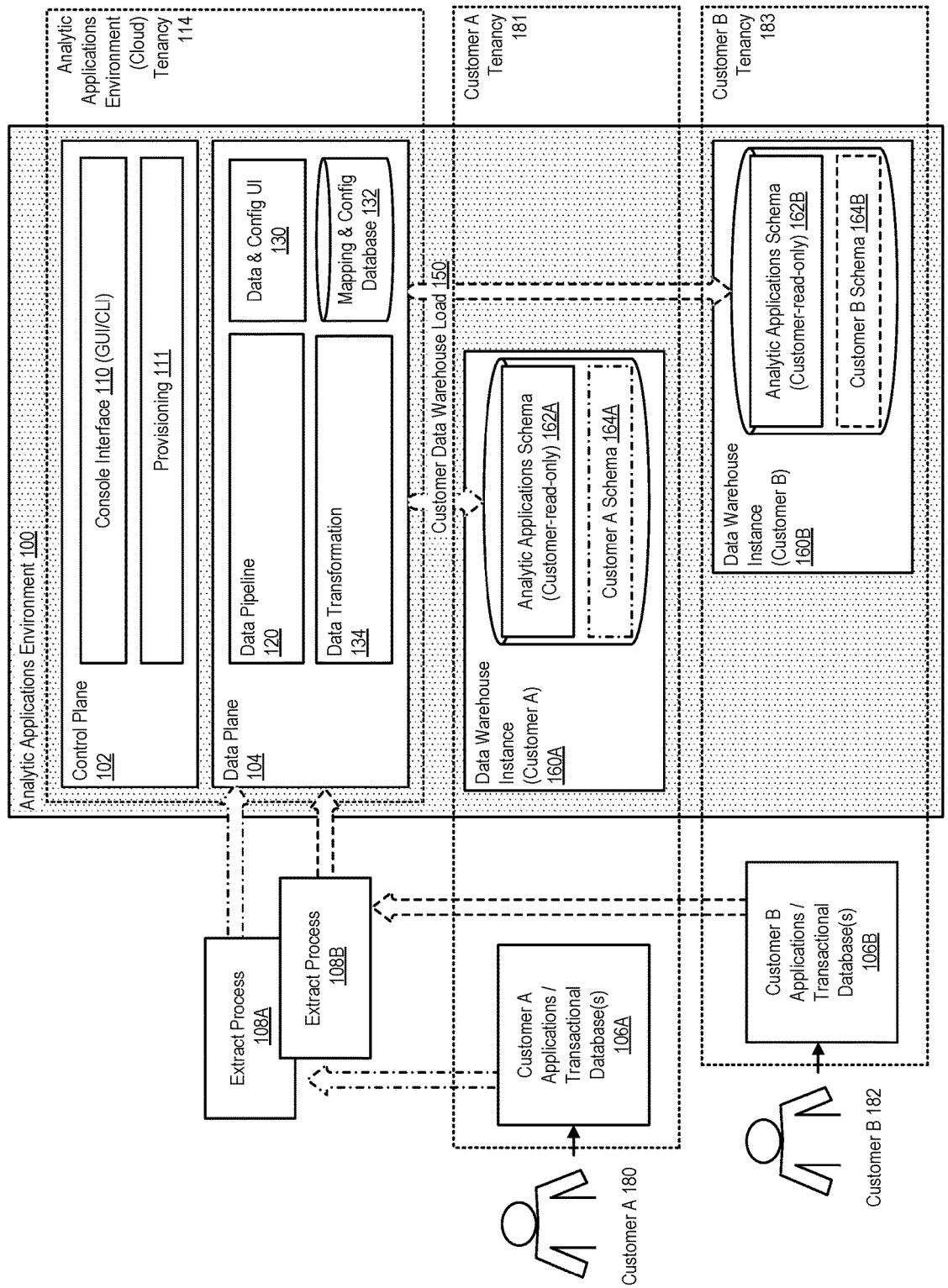
FIG. 4 further illustrates a system for providing an analytic applications environment, in accordance with an embodiment.

FIG. 4 further illustrates a system for providing an analytic applications environment, in accordance with an embodiment.

As illustrated in FIG. 4, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, an analytic applications schema that is updated on a periodic or other basis, by the system in accordance with best practices for a particular analytics use case.

For each of a plurality of customers (e.g., customers A, B), the system uses the analytic applications schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the analytic applications environment also provides, for each of a plurality of customers of the environment, a customer schema 164A, 164B that is readily modifiable by the customer, and which allows the customer to supplement and utilize the data within their own data warehouse instance.

As described above, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

Activation Plans

Figure 5:
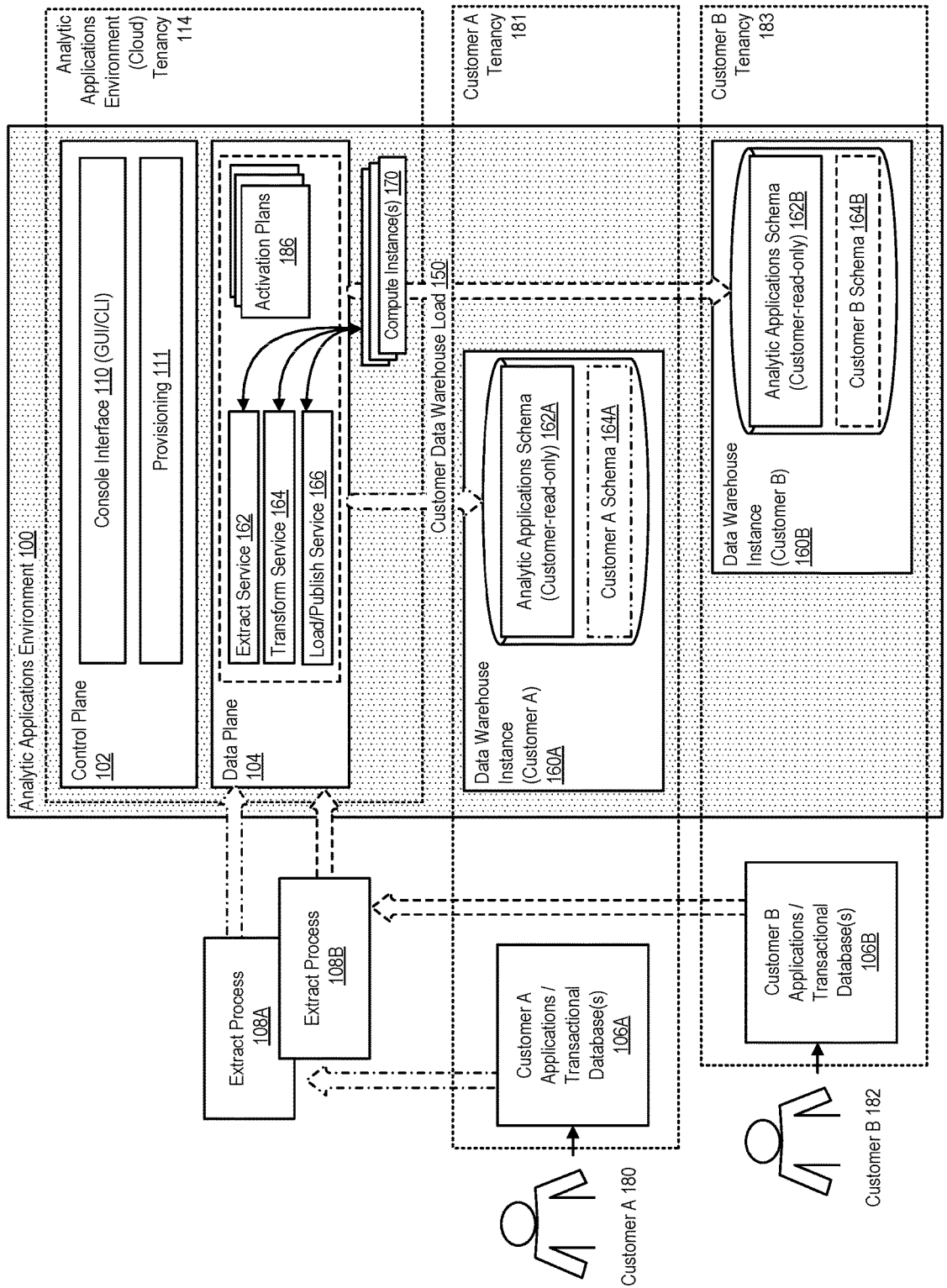
FIG. 5 further illustrates a system for providing an analytic applications environment, in accordance with an embodiment.

FIG. 5 further illustrates a system for providing an analytic applications environment, in accordance with an embodiment.

In accordance with an embodiment, activation plans 186 can be used to control the operation of the data pipeline or process services for a customer, for a particular functional area, to address that customer's (tenant's) particular needs.

For example, an activation plan can define a number of extract, transform, and load (publish) services or steps to be run in a certain order, at a certain time of day, and within a certain window of time.

Each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

In accordance with an embodiment, activation plans can be stored in the mapping and configuration database and are customizable by the customer via the data and configuration UI. Each customer can have a number of activation plans. Compute instances/services (virtual machines) which execute the ETL process for various customers, according to their activation plans, can be dedicated to a particular service for the use of an activation plan, and then released for use by other services and activation plans.

In accordance with an embodiment, based on a determination of historical performance data recorded over a period of time, the system can optimize the execution of activation plans, e.g., for one or more functional areas associated with a particular tenant, or across a sequence of activation plans associated with multiple tenants, to address utilization of the VMs and service level agreements (SLAs) for those tenants. Such historical data can include statistics of load volumes and load times.

For example, the historical data can include size of extraction, count of extraction, extraction time, size of warehouse, transform time, publish (load) time, view object extract size, view object extract record count, view object extract time, warehouse table count, count of records processed for a table, warehouse table transform time, publish table count, and publish time. Such historical data can be used to estimate and plan current and future activation plans in order to organize various tasks to, such as, for example, run in sequence or in parallel to arrive at a minimum time to run an activation plan. In addition, the gathered historical data can be used to optimize across multiple activation plans for a tenant. In some embodiments, the optimization of activation plans (i.e., a particular sequence of jobs, such as ETLs) based upon historical data can be automatic.

ETL Process Flow

Figure 6:
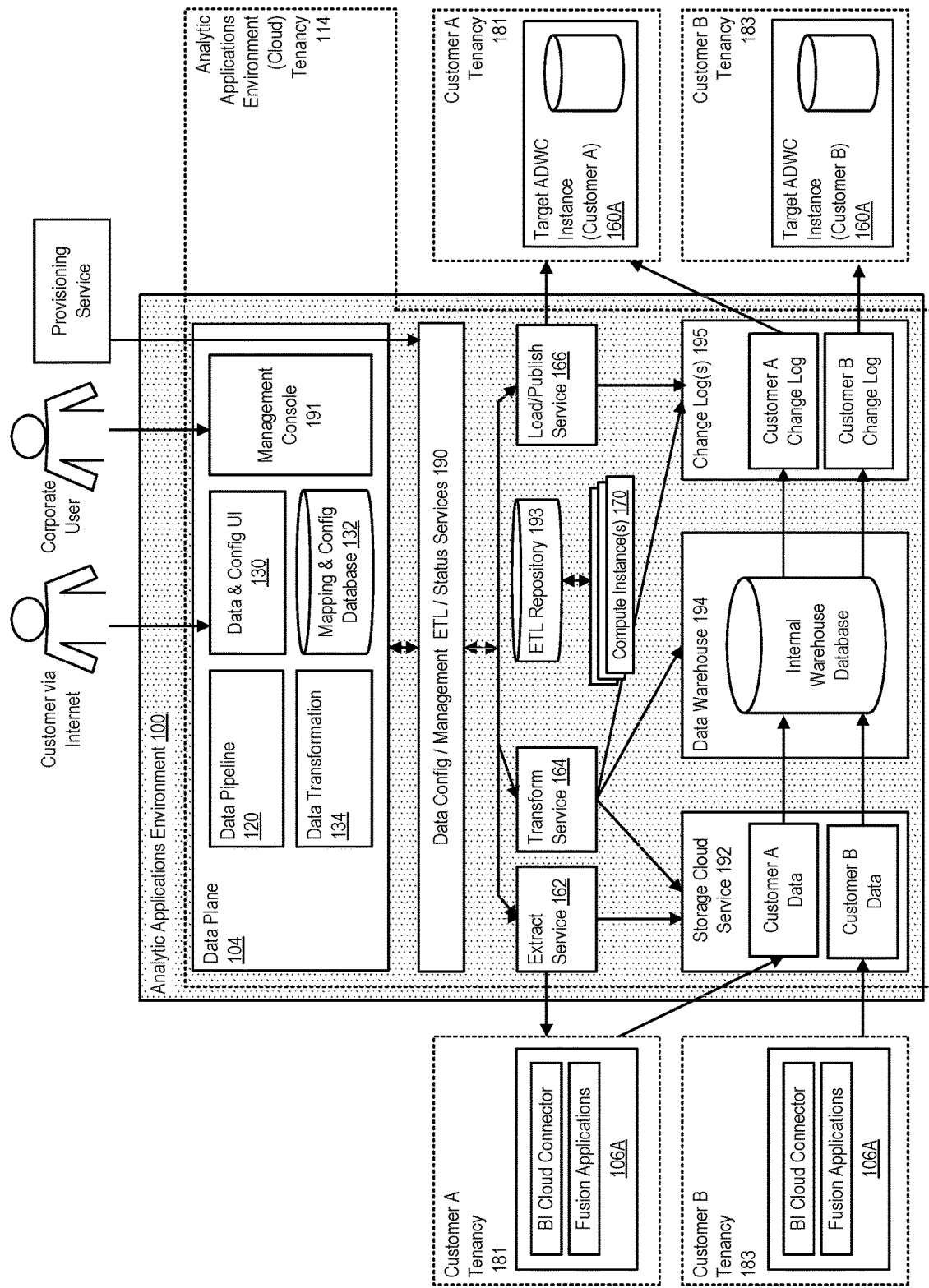
FIG. 6 further illustrates a system for providing an analytic applications environment, in accordance with an embodiment.

FIG. 6 further illustrates a system for providing an analytic applications environment, in accordance with an embodiment.

As illustrated in FIG. 6, in accordance with an embodiment, the system enables a flow of data, controlled by a data config/management/ETU/status services 190 within an (e.g., Oracle) managed tenancy, from each customer's enterprise software application environment (e.g., their Fusion Applications environment), including in this example, a BICC component, via a storage cloud service 192, e.g., OSS, and from there to a data warehouse instance.

As described above, in accordance with an embodiment, the flow of data can be managed by one or more services, including for example, an extract service, and a transform service as described above, and with reference to an ETL repository 193, that takes the data from the storage cloud service, and loads the data into an internal target data warehouse (e.g., IADVV) 194, which is internal to the data pipeline or process and is not exposed to the customer.

In accordance with an embodiment, data is moved in stages into the data warehouse, and thereafter into database table change logs 195, from where the load/publish service can load the customer data into a target data warehouse instance associated with and accessible by the customer, within its customer tenancy.

ETL Stages

Figure 7:
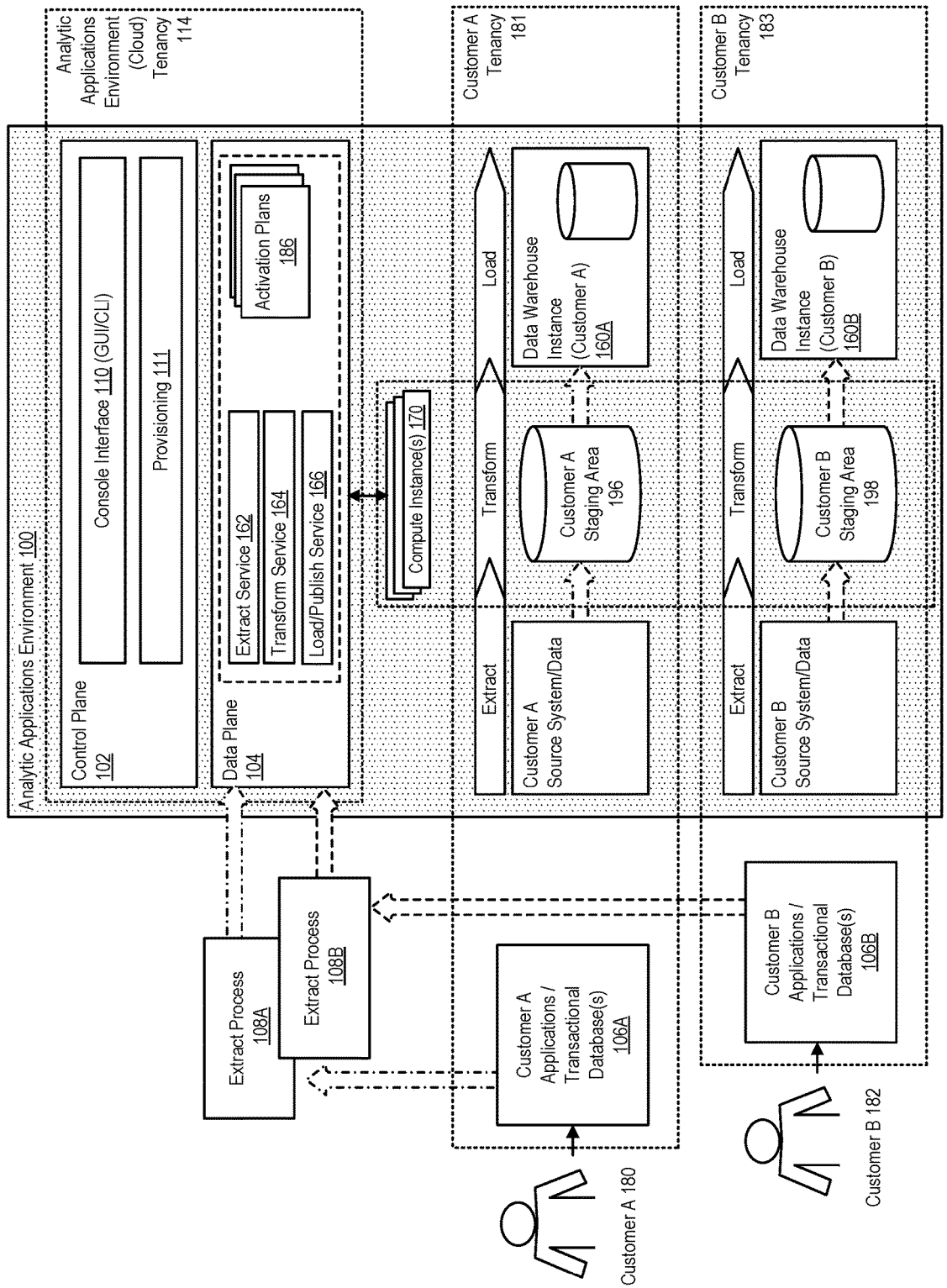
FIG. 7 further illustrates a system for providing an analytic applications environment, in accordance with an embodiment.

FIG. 7 further illustrates a system for providing an analytic applications environment, in accordance with an embodiment.

In accordance with an embodiment, the extracting, transforming and loading data from enterprise applications to a data warehouse instance involves multiple stages, and each stage can have several sequential or parallel jobs; and run on different spaces/hardware, including different staging areas 196, 198 for each customer.

Analytic Applications Environment Metrics

Figure 8:
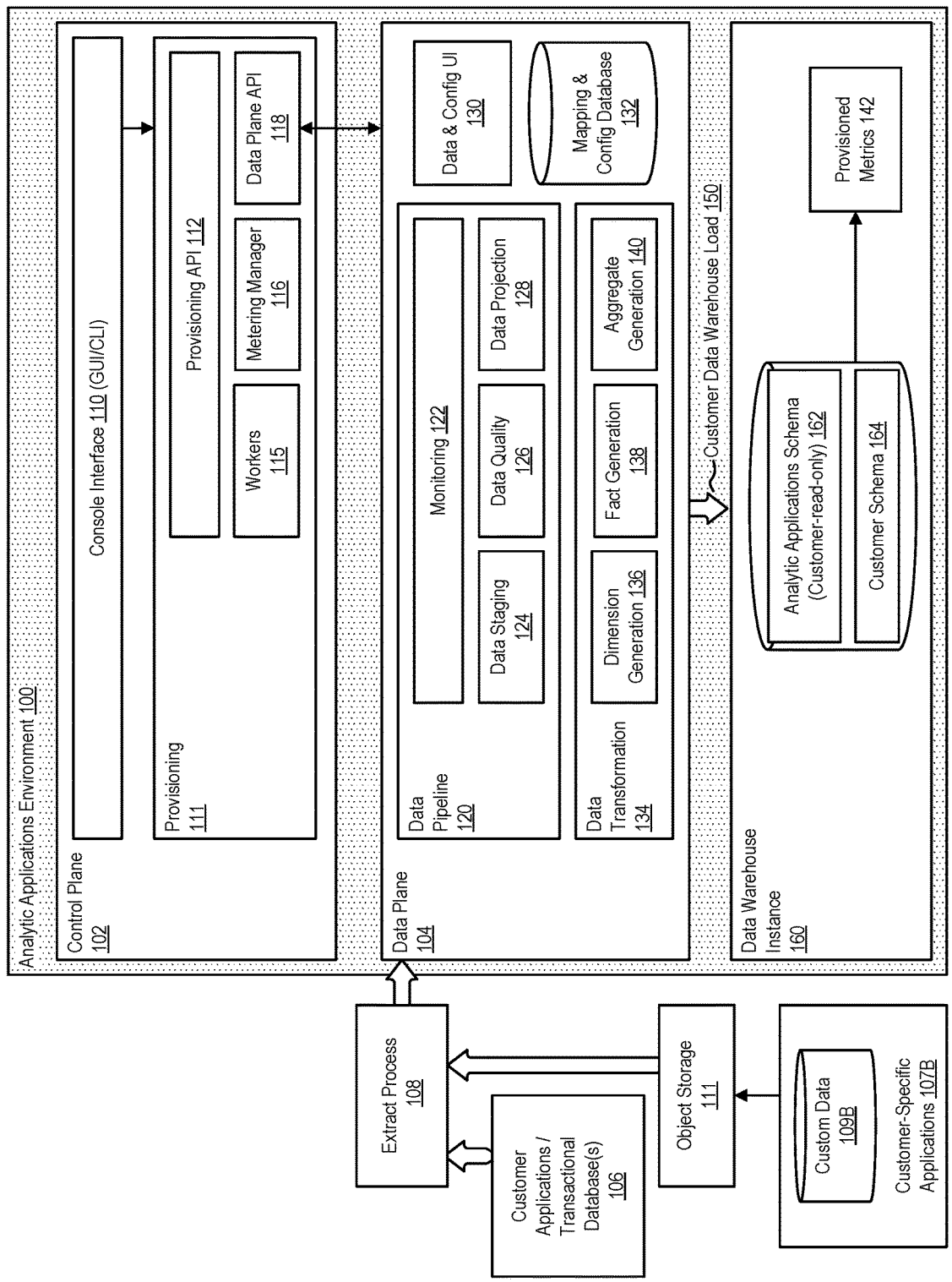
FIG. 8 further illustrates a system for providing an analytic applications environment, in accordance with an embodiment.

FIG. 8 further illustrates a system for providing an analytic applications environment, in accordance with an embodiment.

As illustrated in FIG. 8, in accordance with an embodiment, the metering manager can include functionality that meters services and usage of services provisioned through the control plane, and provide provisioned metrics 142.

For example, the metering manager can record a usage over time of processors provisioned via the control plane, for particular customers, for billing purposes. Likewise, the metering manager can record an amount of storage space of data warehouse partitioned for use by a customer of the SaaS environment, for billing purposes.

Analytic Applications Environment Customization

Figure 9:
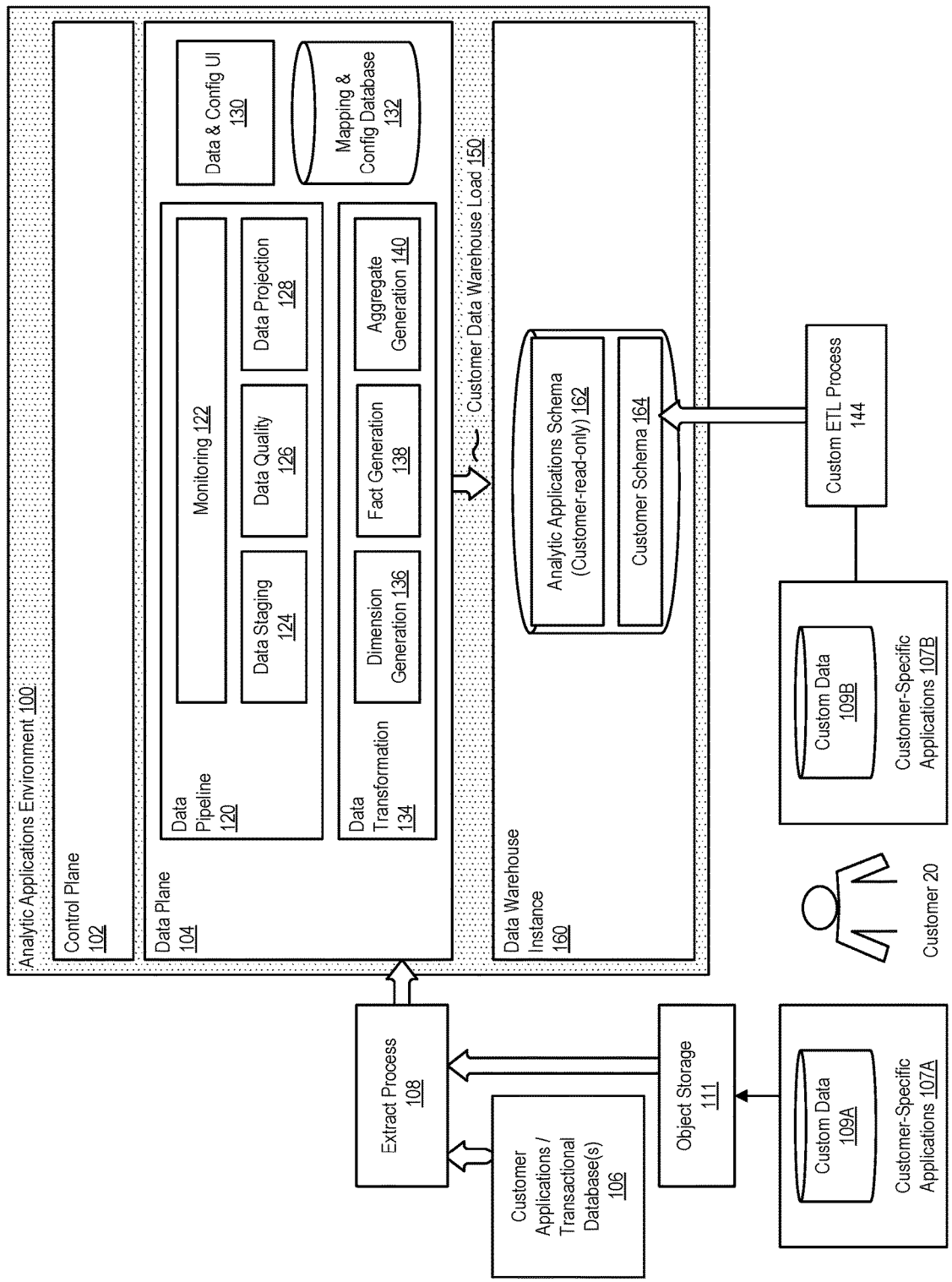
FIG. 9 further illustrates a system for providing an analytic applications environment, in accordance with an embodiment.

FIG. 9 further illustrates a system for providing an analytic applications environment, in accordance with an embodiment.

As illustrated in FIG. 9, in accordance with an embodiment, in addition to data that can be sourced, e.g., from a customer's enterprise software application or data environment, using the data pipeline process as described above; one or more additional custom data 109A, 109B, that is sourced from one or more customer-specific applications 107A, 107B, can also be extracted, transformed, and loaded to a data warehouse instance, using either: the data pipeline process as described above, including in some examples the use of an object storage for storage of the data; and/or a custom ETL or other process 144 that is mutable from the customer's perspective. Once data has been loaded into their data warehouse instance, customers can create business database views that combine tables from both their customer schema and the software analytic application schema; and can query their data warehouse instance using an interface provided, for example, by a business productivity and analytics product suite, or by a SQL tool of the customer's choice.

Analytic Applications Environment Method

Figure 10:
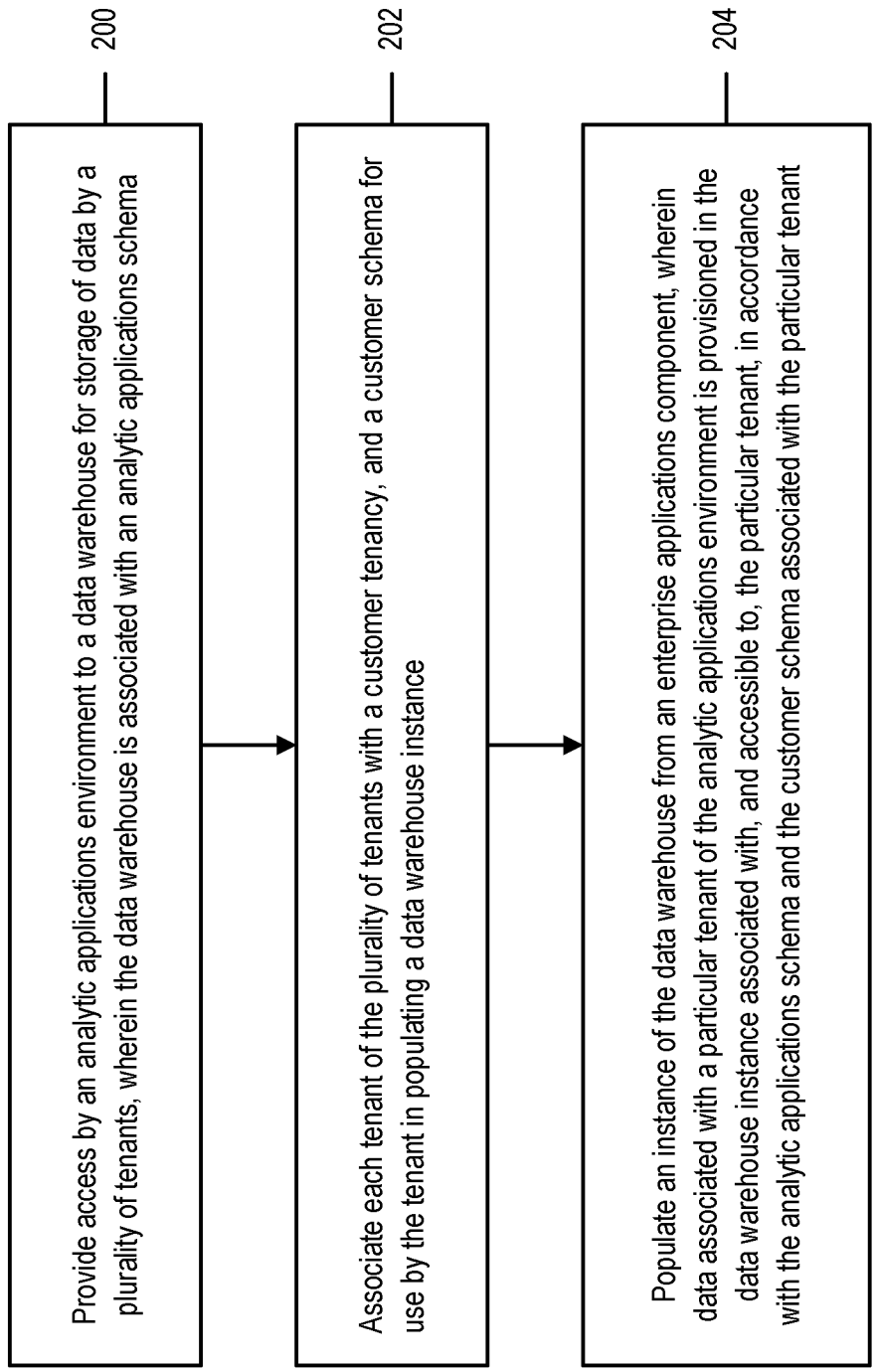
FIG. 10 illustrates a flowchart of a method for providing an analytic applications environment, in accordance with an embodiment.

FIG. 10 illustrates a flowchart of a method for providing an analytic applications environment, in accordance with an embodiment.

As illustrated in FIG. 10, in accordance with an embodiment, at step 200, an analytic applications environment provides access to a data warehouse for storage of data by a plurality of tenants, wherein the data warehouse is associated with an analytic applications schema.

At step 202, each tenant of the plurality of tenants is associated with a customer tenancy, and a customer schema for use by the tenant in populating a data warehouse instance.

At step 204, an instance of the data warehouse is populated with data received from an enterprise software application or data environment, wherein data associated with a particular tenant of the analytic applications environment is provisioned in the data warehouse instance associated with, and accessible to, the particular tenant, in accordance with the analytic applications schema and the customer schema associated with the particular tenant.

Universal Format Driven Data Transformation

In conventional ETL operations, the transform process that transforms data from the source format to the destination format is based on a transformation program or tool. There are currently a number of programs and tools that are used for ETL operations, an example of which is Oracle Data Integrator (ODI). Conventionally, the logic and mappings that are used in such programs and tools are developed around the chosen transform program or tool. That is, the logic and mappings that are used within an ETL process are conventionally based upon the selected and designed for the program or tool running the ETL.

In accordance with an embodiment, a universal, format-driven data transform can be achieved through the use of a data transformation format with editable variables. Such a data transformation format can comprise a human-readable format such that a user interacting with or editing the data transformation format can readily understand, and edit, the target (target table where data is to be extracted to) of the data to be extracted, the definition of the source of the data to be extracted, several options associated with both the target and the source, and the transformation logic (e.g., mappings) defined in data transformation format. Such a data transformation format can be provided in the form of an editable file, such, by way of example and not limitation, a JSON-like file, a text file, etc.

In accordance with an embodiment, the above discussed data transformation format can comprise be program/tool agnostic. That is, given the data transformation format, any ETL program or tool (e.g., ODI) can be used to for the ETL operation, thereby making the particular transformation program or tool a secondary decision, and a decision that can change over time (e.g., the ETL program or tool receives an update, a new ETL program or tool is selected by an administrator or user, etc.)

In accordance with an embodiment, the data transformation format discussed above can comprise a set of instructions for carrying out a data transform from the source dataset to a target table, based at least upon metadata extracted from the source dataset, as well as a format of the target table. The ETL tool/program can parse the data transformation format to retrieve the instructions provided therein, and integrate these instructions to the tool or program selected.

Figure 11:
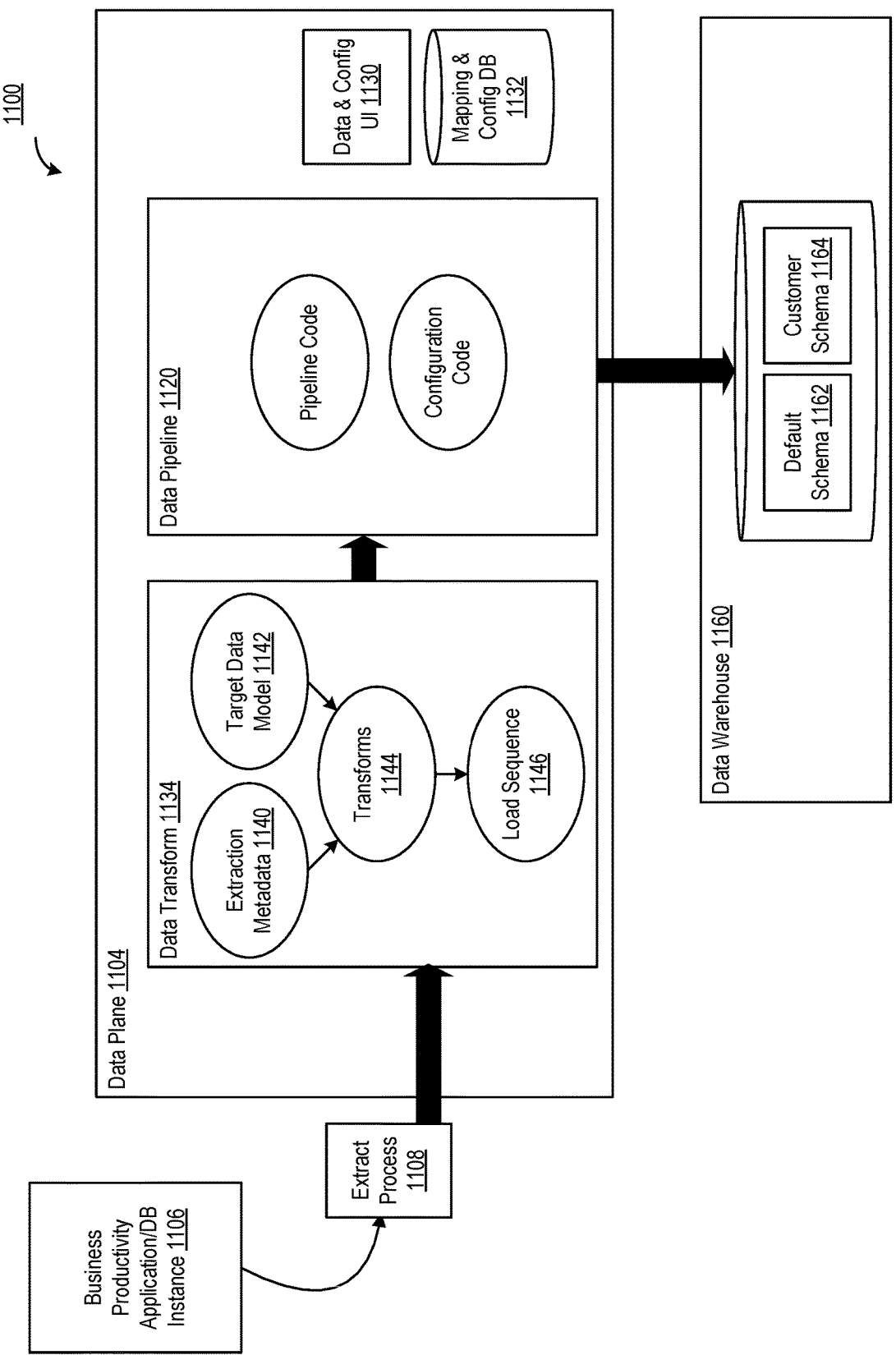
FIG. 11 illustrates a system for universal format driven data transformation, in accordance with an embodiment.

FIG. 11 illustrates a system for universal format driven data transformation, in accordance with an embodiment. Data transform 1134 can provide a universal, data driven transformation format, where the format indicates to data pipeline 1120 what to extract from the source (e.g., extraction metadata 1140), the structure of the data warehouse that the source data will be transformed into (e.g., target data model 1142), and a universal format driven transform instructions (e.g., transforms 1144). Given this information from data transform 1134, data pipeline 1120 can use a transformation program, e.g., comprising a pipeline code and a configuration code, to transfer the extracted data of the source according to the universal format driven instructions. This can be accomplished by using, e.g., the load sequence 1146.

In accordance with an embodiment, a universal, data transformation format can include target table information, various parameters, a target table type, an execution order, a loading pattern, a target operation, a data list, and dataset operations. In accordance with an embodiment, the various parameters associated with the data transformation format can be, in turn, associated with a number of editable members of the data transformation format.

In accordance with an embodiment, the data transformation 1134 can be stored in memory of, or accessible by, the analytics environment, such as the mapping and configuration database. The data transformation can be created based upon a relationship between a source database and a target database. In some embodiments, the data transformation is created automatically. The data transformation 1134 can be modified and/or updated according to updates within either a source or at the target (e.g., customer schema 1164 or default schema 1162).

In accordance with an embodiment, the data list can include a dataset and the dataset can include an input tables list, any needed joins, any needed filters, an aggregation flag, a distinct flag, and target column mappings. Listing 1 shows an exemplary universal, data driven transformation format, in accordance with an embodiment.

Listing 1

```
'Target Table Transformation->' [transformation name]
    'Target Table Name:' [name of the target table]
    'Parameters:' [ List of Variables used in the current UF ]
    'Target Table Type:' [LOV: PERMANENT / TEMP]
    'Execution Order:'
    'Loading Pattern:' [LOV: FULL / INCREMENTAL]
    'Target Operation:' [LOV: INSERT / UPSERT / UPDATE / DELETE]
    'Dataset List->'
        'Dataset->' [Ex. Dataset1, Dataset2, etc.]
            'Input Tables List->'
                'Input Table->' [name the table]
                    'Input Model Type:' [LOV: Fusion, WH, TEMP,
                    DUMMY,APPS]
                    'Alias:' [Unique Alias Name for the Whole UF even
            including Temp tables]
                    'Incremental:' [LOV: Y / N] '
                Input Table:End'
            'Input Tables List:End'
            'Joins->'
                'Join:'
                'Join Name:' Sample Given Below
            'Joins:End'
            'Filters->' Sample Given Below
            'Filters: End'
            'Aggregation Flag:' [LOV: Y / N]
            'Distinct Flag:' [LOV: Y / N]
            'Target Column Mappings->'
                [Examples-INVOICE_ID = PAYMENTSCHEDULEPVO.
                InvoiceId
                    INVOICE_SCHEDULE_NUMBER =
            PAYMENTSCHEDULEPVO.PaymentNum ]
            'Target Column Mappings:End'
        'Dataset:End'
    'Dataset List:End'
    'Dataset Operations->'
    [ In case of only one dataset, Remove Dataset operation tag
    itself if there is no dataset operation needed]
        'Dataset Operation:'
        'Dataset Operation Name:'
    'Dataset Operations:End'
'Target Table Transformation:End'
```

In accordance with an embodiment, the editable value associated with member 'Target Table Name' can define the target (destination) of the ETL process. Depending upon the source of the data, as well as a context of a user, the editable value associated with this member can be changed or updated.

In accordance with an embodiment, the editable value associated with member 'Parameters' can define a list of variables to be used in the current human readable format.

In accordance with an embodiment, the editable value associated with member 'Target Table Type" can define the type of the target. For example, a type of a target could be a temporary (intermediary) table that is used only in an intermediate step of an ETL process. Alternatively, the type defined can specify that the target is a permanent table.

In accordance with an embodiment, the editable value associated with member 'Execution Order' can define in what order the current transformation should take place with respect to other transformations. This can be set, e.g., based upon a dependency of one transformation on another pending transformation.

In accordance with an embodiment, the editable value associated with member 'Loading Pattern:' can define a loading pattern, e.g., whether the load is a full load, or an incremental load.

In accordance with an embodiment, the editable value associated with member 'Target Operation:' can define the type of operation to take place at the target. Such operations could include, but are not limited to, an insert operation, an upsert operation, and update operation, or a delete operation.

In accordance with an embodiment, the editable value associated with member 'Dataset→' can define the dataset(s) from which source data is to be extracted.

In accordance with an embodiment, the editable value associated with member 'Input Table→' can define the names of tables from which source data is to be extracted.

In accordance with an embodiment, the editable value associated with member 'Input Model Type:' can define the type of data (e.g., format of the data) that is located at the input source. Examples include, but are not limited to, Fusion, WH, TEMPO, DUMMY, APPS, etc.

In accordance with an embodiment, the editable value associated with member 'Alias:' can define a unique alias name for the whole human readable format, including temporary tables.

In accordance with an embodiment, the editable value associated with member Incremental:' can define whether the input table should be incremental.

In accordance with an embodiment, the editable value associated with member 'Join:' and "Join Name" can define whether a number of input tables should be joined to form part of the dataset. In addition, the Join Name member can define the name of the joined table.

In accordance with an embodiment, the editable value associated with member 'Filters→' can define a number of filters to be applied to an input table(s) or a joined table(s).

In accordance with an embodiment, the editable value associated with member 'Aggregation Flag:' can define whether aggregation is valid or not.

In accordance with an embodiment, the editable value associated with member Distinct Flag:' can define whether aggregation is valid or not.

In accordance with an embodiment, the editable value associated with member 'Target Column Mappings→' can define the mapping of columns at the target. An example is shown below:

INVOICE_ID=PAYMENTSCHEDULEPVO.InvoiceId
INVOICE_SCHEDULE_NUMBER=PAYMENTSCHE-
    DULEPVO.PaymentNum In accordance with an embodiment, the editable value associated with member 'Dataset Operations→' can define dataset operations, as well as defining a name for each dataset operation.

In accordance with an embodiment, with reference to Listing 1, keywords in the format can include the associated single quotes (e.g., 'Alias', 'Target Table Name', 'Parameters', etc.). Keywords with a single line specification can have a ':' suffix (e.g., 'Alias:'). Keywords with multiple line specifications can have a '→' suffix ('Filters→'). The end of a multiple line Keyword can be the keyword suffixed by the word "End" after the colon (e.g., 'Filters:End'). In an embodiment, there can be no extra space between the Keyword and End. Keywords can be separated by white spaces. The transformation file can be case insensitive.

With additional reference to Listing 1, in accordance with an embodiment, in order to remain universal, the common SQL format 'WHERE' keyword and other non-universal syntax, such as Oracle® SQL syntax (e.g., a.employee=b.manager) can be omitted in the filter clause. A preceding $VAR_CONFIG_<VariableName>$ denotes a configuration parameter. Comments can start with '/' and end with '/' (exclusive of the quotes). For the Target Column List, when there are multiple-line expressions, a line can end with "\\" (exclusive of the quotes) so that a parser knows that the line continues on the next line.

In accordance with an embodiment, a universal, data driven transformation format can be in a human-readable format, such as shown in Listing 1. This allows for ease of creation and editing, and allows for non-technical users (e.g., business decision makers) to easily understand the transformation procedure. The universal, data driven transformation format can be stored and read as a common text file, in accordance with an embodiment.

In accordance with an embodiment, Table 1 includes a list of exemplary keywords, exemplary valid values of those keywords and comments pertaining to the keywords and valid values.

TABLE 1

| Keyword | Valid Values | Comment |
|---|---|---|
| Target Table Type | PERMANENT | UF of PERMANENT type to define the main logic and transformations |
| | TEMP | UF of TEMP type to define the Subquery in the main transformation. Also it should be used as Input Table in the main UF file. |
| Parameters | FAW Data model variables | List all the variables used in the Current UF |
| Execution Order | Numeric Value 10,20,30,90 | While loading the same target table by two different HRF, Specify the order of execution. If only one HRF, then the default value will be 10. The lower value will take the precedence. All Unspecified HRFs, should be executed at Last. So, please specify the execution order as 90. Unless there are any special requirements to load the Unspecified record, in between the interfaces, the execution order of Unspecified HRF should be the maximum. |
| Loading Pattern | FULL | FULL - Always Truncate and Load |
| | INCREMENTAL | INCREMENTAL - First Time Full Load and Incremental in Subsequent Loads |
| Target Operation | INSERT | INSERT - For Full Load |
| | UPSERT | UPSERT - For Incremental Load |
| | UPDATE | UPDATE - For Update only |
| | E | DELETE - For Delete only |
| Input Model Type | Fusion | |
| | WH | |
| | TEMP | |

TABLE 1-continued

| Keyword | Valid Values | Comment |
|---|---|---|
| | DUMMY APPS | |
| Incremental | Y N | Y means that W$_UPDATE_DT column will be used to drive the incremental load |
| Join | | 'Join:' JournalLinePVO INNER JOIN DW_GL_CODE_COMBINATION_D ON journalLinePVO.JrnlLineCodeCombinationId=DW_GL_COD E_COMBINATION_D.CODE_COMBINATION_ID<br>'Join Name:' Journals<br>'Join:' Journals INNER JOIN LedgerPVO ON JournalLinePVO.JrnlHdrLedgerId=LedgerPVO.LedgerId<br>'Join Name:' journalledger<br>    'Join:' journalledger LEFT OUTER<br>    JOIN LEBSVPVO ON<br>    JournalLinePVO.JrnlHdrLedgerId=LEBSVPVO.Obje ctId<br>'Join Name:' jourledlebspvo |
| Filters | | PARTY_SITE_USE_VO.SiteUseCode = 'BILL_TO' and Bill_To_Date >= TO_TIMESTAMP('$VAR_CONFIG_INITIAL_EXTRACT_ DATES','YYYY-MM-DD HH24:MI:SS.FF9')] |
| Aggregation Flag | Y | |
| Distinct Flag | Y | |
| Dataset Operations-> | | If the operation is like ((Dataset1 UNION ALL Dataset2) UNION ALL (Dataset3 UNION ALL dataset4)) MINUS dataset5<br>    'Dataset Operations->'<br>        'Dataset Operation:' Dataset1 UNION ALL Dataset2<br>        'Dataset Operation Name:' SET1<br>        'Dataset Operation:' Dataset3 UNION ALL Dataset4<br>        'Dataset Operation Name:' SET2<br>        'Dataset Operation:' SET1 UNION SET2<br>        'Dataset Operation Name:' SET3<br>        'Dataset Operation:' SET3 MINUS Dataset5<br>        'Dataset Operation Name:' SET4<br>    'Dataset Operations:End' |

In accordance with an embodiment, an exemplary filename format Is illustrated in Table 2,

TABLE 2

For Main file : UF_<target_tablename>.txt.
For Temporary files (e.g., a sub query):
UF_<target_tablename>_TEMP1.txt, UF_<target_tablename>_TEMP2.txt.
For Temp File (Permanent):UF_<target_tablename>_STAGE.txt,

TABLE 2-continued

UF_<target_tablename>_STAGE1.txt, UF_<target_tablename>_STAGE2.txt.
For Unspecified HRF Files : UF_<target_tablename>_Unspecified.txt In accordance with an embodiment, the below listing 2 is an example of a universal format driven data transformation for a general ledger:

Listing 2

```
'Target Table Transformation->' Load GL Journal Custom Fact for
currency
    'Target Table Name:' DW_GL_JOURNAL_CF
    'Parameters:'
$VAR_CONFIG_GLOBAL_CURRENCY$,$VAR_CONFIG_EXCHANGE_RATE_TYPE$
    'Target Table Type:' PERMANENT
    'Execution Order:' 10
    'Loading Pattern:' INCREMENTAL
    'Target Operation:' UPSERT
    'Dataset List->'
        'Dataset->' Dataset1
            'Input Tables List->'
                'Input Table->'DW_GL_JOURNAL_F
                'Input Model Type:'WH
                'Alias:'JournalFact
                'Incremental:' Y
                'Input Table:End'
                'Input Table->'DW_GLOBAL_EXCH_RATE_CG
                'Input Model Type:'WH
                'Alias:'Exchange
                'Incremental:' Y
                'Input Table:End'
```

| Listing 2 |
| --- |

```
        'Input Tables List:End'
        'Joins->'
            'Join:' JournalFact LEFT OUTER JOIN Exchange ON
(JournalFact.CURRENCY_CONVERSION_DATE=Exchange.CONVERSION_DATE AND
JournalFact.LEDGER_CURRENCY_CODE=Exchange.FROM_CURRENCY_CODE AND
Exchange.GLOBAL_CURRENCY_CODE = '$VAR_CONFIG_GLOBAL_CURRENCY$' AND
Exchange.GLOBAL_CURR_CONVERSION_TYPE =
'$VAR_CONFIG_EXCHANGE_RATE_TYPE$')
            'Join Name:' CurrencyConv
        'Joins: End'
        'Filters->'
        'Filters: End'
        'Aggregation Flag:'N
        'Distinct Flag:' N
        'Target Column Mappings->'
            FISCAL_PERIOD_SET_NAME=JournalFact.FISCAL_PERIOD_SET_NAME
            FISCAL_PERIOD_NAME =JournalFact.FISCAL_PERIOD_NAME
            ACCT_PERIOD_START_DATE=JournalFact.ACCT_PERIOD_START_DATE
            ACCT_PERIOD_END_DATE =JournalFact.ACCT_PERIOD_END_DATE
            JOURNAL_BATCH_NAME =JournalFact.JOURNAL_BATCH_NAME
            JOURNAL_HEADER_ID =JournalFact.JOURNAL_HEADER_ID
            JOURNAL_HEADER_NAME =JournalFact.JOURNAL_HEADER_NAME
            JOURNAL_HEADER_DESCRIPTION
=JournalFact.JOURNAL_HEADER_DESCRIPTION
            JOURNAL_POSTED_DATE =JournalFact.JOURNAL_POSTED_DATE
JRNL_HDR_DFLT_EFFECTIVE_DATE=JournalFact.JRNL_HDR_DFLT_EFFECTIVE_DATE
            LEDGER_ID =JournalFact.LEDGER_ID
            JOURNAL_CATEGORY =JournalFact.JOURNAL_CATEGORY
            JOURNAL_SOURCE =JournalFact.JOURNAL_SOURCE
            JOURNAL_LINE_NUM =JournalFact.JOURNAL_LINE_NUM
            JOURNAL_LINE_DESCRIPTION
=JournalFact.JOURNAL_LINE_DESCRIPTION
            JOURNAL_LINE_STATUS =JournalFact.JOURNAL_LINE_STATUS
            DEBIT_CREDIT_IND =JournalFact.DEBIT_CREDIT_IND
            TRANSACTION_CURRENCY_AMOUNT
=JournalFact.TRANSACTION_CURRENCY_AMOUNT
            TRANSACTION_CURRENCY_CODE
=JournalFact.TRANSACTION_CURRENCY_CODE
            LEDGER_CURRENCY_AMOUNT =JournalFact.LEDGER_CURRENCY_AMOUNT
            LEDGER_CURRENCY_CODE =JournalFact.LEDGER_CURRENCY_CODE
            SOURCE_RECORD_ID =JournalFact.SOURCE_RECORD_ID
            CODE_COMBINATION_ID =JournalFact.CODE_COMBINATION_ID
            COST_CENTER_SEGMENT =JournalFact.COST_CENTER_SEGMENT
            COST_CENTER_VALUESET_CODE
=JournalFact.COST_CENTER_VALUESET_CODE
            GL__BALANCING_SEGMENT =JournalFact.GL__BALANCING_SEGMENT
            GL__BLNC_SGMNT_VALUESET_CODE
=JournalFact.GL__BLNC_SGMNT_VALUESET_CODE
            LEGAL_ENTITY_ID=JournalFact.LEGAL_ENTITY_ID
            NATURAL_ACCOUNT_SEGMENT
=JournalFact.NATURAL_ACCOUNT_SEGMENT
NTRL_ACNT_SGMNT_VALUESET_CODE=JournalFact.NTRL_ACNT_SGMNT_VALUESET_COD
E
            GL_SEGMENT1=JournalFact.GL_SEGMENT1
GL_SEGMENT1_VALUESET_CODE=JournalFact.GL_SEGMENT1_VALUESET_CODE
            GL_SEGMENT2 =JournalFact.GL_SEGMENT2
            GL_SEGMENT2_VALUESET_CODE
=JournalFact.GL_SEGMENT2_VALUESET_CODE
            GL_SEGMENT3 =JournalFact.GL_SEGMENT3
GL_SEGMENT3_VALUESET_CODE=JournalFact.GL_SEGMENT3_VALUESET_CODE
            GL_SEGMENT4 =JournalFact.GL_SEGMENT4
            GL_SEGMENT4_VALUESET_CODE
=JournalFact.GL_SEGMENT4_VALUESET_CODE
            GL_SEGMENT5 =JournalFact.GL_SEGMENT5
            GL_SEGMENT5_VALUESET_CODE
=JournalFact.GL_SEGMENT5_VALUESET_CODE
            GL_SEGMENT6 =JournalFact.GL_SEGMENT6
            GL_SEGMENT6_VALUESET_CODE
=JournalFact.GL_SEGMENT6_VALUESET_CODE
            GL_SEGMENT7 =JournalFact.GL_SEGMENT7
GL_SEGMENT7_VALUESET_CODE=JournalFact.GL_SEGMENT7_VALUESET_CODE
            GL_SEGMENT8 =JournalFact.GL_SEGMENT8
            GL_SEGMENT8_VALUESET_CODE
=JournalFact.GL_SEGMENT8_VALUESET_CODE
            GL_SEGMENT9 =JournalFact.GL_SEGMENT9
            GL_SEGMENT9_VALUESET_CODE
```

Listing 2

```
=JournalFact.GL_SEGMENT9_VALUESET_CODE
        GL_SEGMENT10=JournalFact.GL_SEGMENT10
GL_SEGMENT10_VALUESET_CODE=JournalFact.GL_SEGMENT10_VALUESET_CODE
        GLOBAL_CURRENCY_AMOUNT=CASE WHEN
JournalFact.LEDGER_CURRENCY_CODE='$VAR_CONFIG_GLOBAL_CURRENCY$') THEN
JournalFact.LEDGER_CURRENCY_AMOUNT \\
        ELSE
(JournalFact.LEDGER_CURRENCY_AMOUNT*Exchange.GLOBAL_EXCHANGE_RATE) \\
        END
        GLOBAL_CURRENCY_CODE='$VAR CONFIG_GLOBAL_CURRENCY$'
        GLOBAL_CURRENCY_EXCH_RATE=CASE WHEN
(JournalFact.LEDGER_CURRENCY_CODE='$VAR_CONFIG_GLOBAL_CURRENCY$') THEN
1 \\
        ELSE
Exchange.GLOBAL_EXCHANGE_RATE END
CURRENCY_CONVERSION_DATE=JournalFact.CURRENCY_CONVERSION_DATE
    'Target Column Mappings:End'
  'Dataset:End'
 'Dataset List:End'
'Target Table Transformation:End'
```

Figure 12:
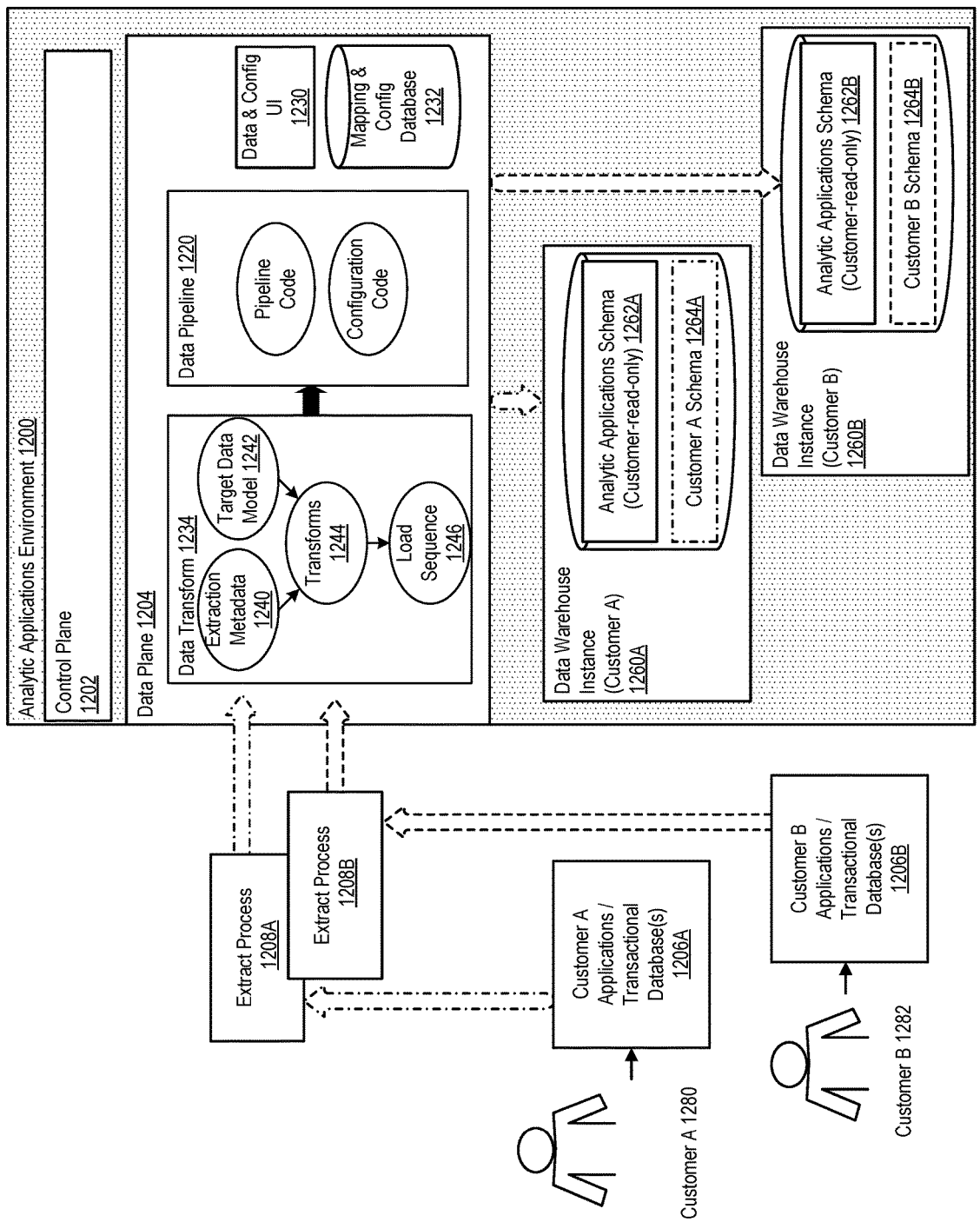
FIG. 12 illustrates a system for universal format driven data transformation in an analytic applications environment, in accordance with an embodiment.

FIG. 12 illustrates a system for universal format driven data transformation in an analytic applications environment, in accordance with an embodiment.

As illustrated in FIG. 12, which illustrates the operation of the system with a plurality of tenants (customers) in accordance with an embodiment, data can be sourced, e.g., from each of a plurality of customer's (tenant's) enterprise software application or data environment 1206A, 1206B. On extraction 1208A, 1208B, respectively, a universal formal driven data transformation can be used within the data plane 1204.

In accordance with an embodiment, transform 1234 can provide a universal, data driven transformation format, where the format indicates to data pipeline 1220 what to extract 1208A, 1208B from the source (e.g., extraction metadata 1240), the structure of the data warehouse that the source data will be transformed into (e.g., target data model 1242), and a universal format driven transform instructions (e.g., transforms 1244). Given this information from data transform 1234, data pipeline 1220 can use a transformation program, e.g., comprising a pipeline code and a configuration code, to transfer the extracted data of the source format according to the universal format driven instructions. This can be accomplished by using, e.g., the load sequence 1246.

In accordance with an embodiment, a universal, data transformation format can include target table information, various parameters, a target table type, an execution order, a loading pattern, a target operation, a data list, and dataset operations. In accordance with an embodiment, the various parameters associated with the data transformation format can be, in turn, associated with a number of editable members of the data transformation format.

In accordance with an embodiment, the data transformation 1234 can be stored in memory of, or accessible by, the analytics environment, such as the mapping and configuration database 1232. The data transformation can be created based upon a relationship between a source database and a target database. In some embodiments, the data transformation is created automatically. The data transformation 1234 can be modified and/or updated according to updates within either a source or at the target (e.g., customer schemas 1206A or 1206B or default schema 1262A/B).

In accordance with an embodiment, the data pipeline or process maintains, for each of a plurality of customers (tenants), for example customer A 1280, customer B 1282, an analytic applications schema that is updated on a periodic or other basis, by the system in accordance with best practices for a particular analytics use case.

As described above, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases.

Figure 13:
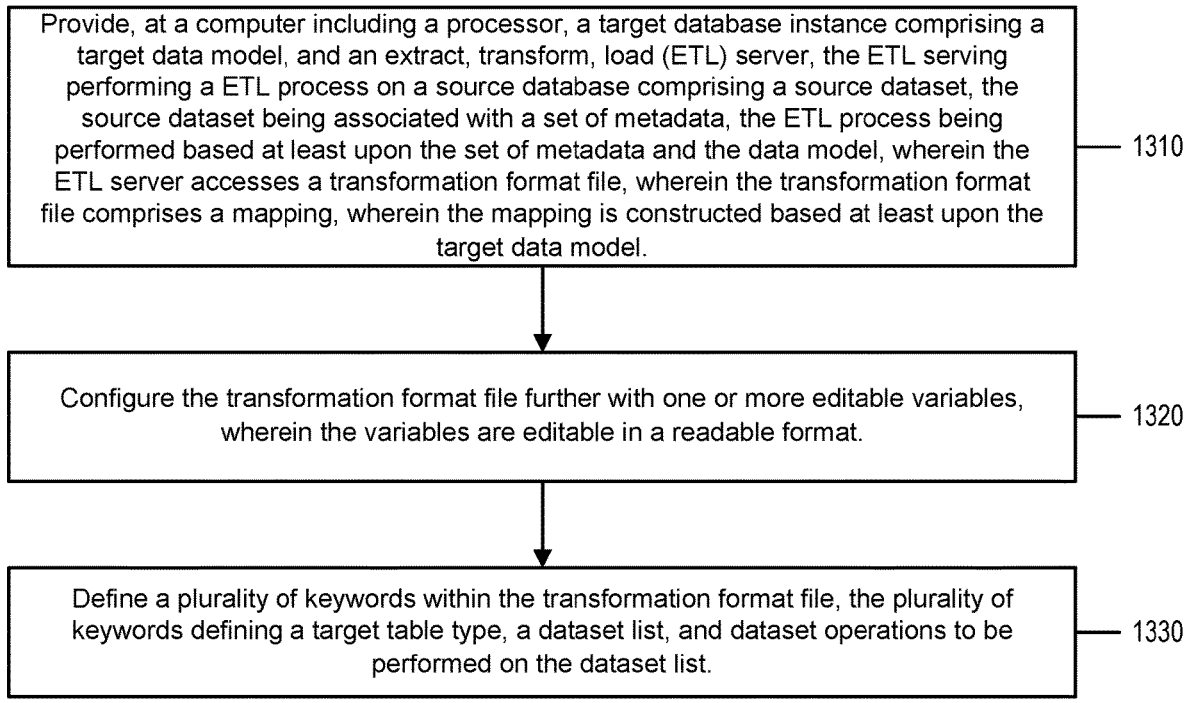
FIG. 13 is a flowchart of a method providing a universal format driven data transformation in an analytics application environment, in accordance with an embodiment.

FIG. 13 is a flowchart of a method providing a universal format driven data transformation in an analytics application environment, in accordance with an embodiment.

In accordance with an embodiment, at step 1310, the method can provide, at a computer including a processor, a target database instance comprising a target data model, and an extract, transform, load (ETL) server, the ETL serving performing a ETL process on a source database comprising a source dataset, the source dataset being associated with a set of metadata, the ETL process being performed based at least upon the set of metadata and the data model, wherein the ETL server accesses a transformation format file, wherein the transformation format file comprises a mapping, wherein the mapping is constructed based at least upon the target data model.

In accordance with an embodiment, at step 1320, the method can configure the transformation format file further with one or more editable variables, wherein the variables are editable in a readable format.

In accordance with an embodiment, at step 1330, the method can define a plurality of keywords within the transformation format file, the plurality of keywords defining a target table type, a dataset list, and dataset operations to be performed on the dataset list.

In accordance with an embodiment, the ETL server can utilize the transformation format file in transforming the source dataset prior to loading the transformed source dataset to an instance of a data warehouse, the instance of the data warehouse being provisioned in the context of a tenant associated with the source dataset.

Key Flex Fields (KFF) in an Analytics Environment

In accordance with an embodiment, a key flex field is a field made up of segments, where each segment has both a value and a meaning. A key flex field can be used to store information represented as codes.

In accordance with an embodiment, codes can be used to identify, for example, general ledger (GL) accounts, part numbers, and other entities associated with a business. Each differing segment in the code of a KFF can be associated with a different aspect of an entity. In an example where a business defines and uses a KFF to represent an item of inventory, for example, a KFF could identify, in order, an inventory type, one or more inventory specifications (e.g., characterizes, color, size . . . etc.), as well as other details about the inventory item. However, a different customer using their own defined KFF to represent a same item of inventory could come up with a different KFF to represent the same inventory item. Between the two customers, while both use a KFF to represent a same inventory item, the KFF for the two customers can have a different segment structure, which are defined within the customer's systems.

In accordance with an embodiment, one of the advantageous a KFF provides is the flexibility that allows a customer to define a number of segments in order to identify or describe differing items. Customers generally, upon the initiation of KFF use within their systems, can define the KFFs (e.g., by defining segments, segment types, segment labels . . . etc.) that are to be used, as well as rules governing, for example, cross-validation.

schema. However, data pulled during the extract process can be stored in the customer schema (where analytics can query the data, based upon the mapping stored therein), while the generated mapping can additionally be stored at the analytic applications schema for later use.

In accordance with an embodiment, key flex fields (KFFs) are implemented as a way to uniquely identify transaction entries, e.g., general ledger (GL) accounts, or bill of materials (BOM) part numbers, and other business entities. Setup steps can be used to define and configure the flexible components of the key fields. In accordance with an embodiment, databases storing transactional data of business productivity applications can offer multiple KFFs, including, e.g., a GL Accounting KFF (e.g., code: GL #).

For example, to define an accounting KFF steps can include defining an Accounting flex field structure, and addition of structure segments. In accordance with an embodiment, structure segments need to be validated, e.g., against a value set or free text. Some of the segments can be mandatory. For instance, regarding an accounting KFF, mandatory segments might include Company, Cost Center, and Natural Accounts. These mandatory fields can be enforced by adding labels to the segments and flex structure compilation rules.

In accordance with an embodiment, Table 3 below shows an exemplary GL Account KFF, including segments, segment labels, and segment assignments.

TABLE 3

| KFF | COA | KFF Segment | KFF Segment Label | KFF Segment Assignment |
| --- | --- | --- | --- | --- |
| GL account KFF | Vision US Chart of Account | Vision Company | Primary Bal Segment* | SEGMENT 1 |
| | | Vision CC | Cost Center Segment* | SEGMENT 3 |
| | | Vision Accounts | Natural Acct Segment* | SEGMENT 2 |
| | | Vision Sub Account | Sub Account Segment | SEGMENT 4 |
| | | Vision Product | Segment 5 | SEGMENT 5 |
| | Vision EU Chart of Account | Company | Primary Bal Segment* | SEGMENT 1 |
| | | Cost Center | Cost Center Segment* | SEGMENT 2 |
| | | Accounts | Natural Acct Segment* | SEGMENT 3 |
| | | Cross Company | Inter Company Segment | SEGMENT 4 |

In accordance with an embodiment, an additional aspect of KFFs is that the different segments can be concatenated to form different, e.g., accounts.

However, one of the difficulties in the systems and methods described herein arise directly from the customizations of KFFs that each customer uses. While each KFF and their segments, segment names, segment labels . . . etc., may be readily understood within the context of each specific customer, issues may arise when such KFFs are uploaded into, e.g., a customer schema at an ADWC as described above. This is because while the mappings for the KFFs (based on metadata, segments, segment labels, and segments) are well defined by each customer, such definitions are not defined within the ADWC, so server tools cannot readily provide analytics based upon data stored in KFFs.

In accordance with an embodiment, systems and methods described herein provide for extracting data from a customer's database instance and gathering the data and metafiles from KFFs stored therein. From the extraction, the systems and methods, metadata and data are then mapped based upon context, and such mapping can be loaded into both the analytic applications schema, as well as the customer In accordance with an embodiment, KFFs can use source data from business productivity applications in order to define segments, segment labels, value sets and value set values to effectively model a system to support flex dimensions. Once flex is setup and segments are marked as BI enabled in a source application, the components, above, are extractable for reporting.

Figure 14:
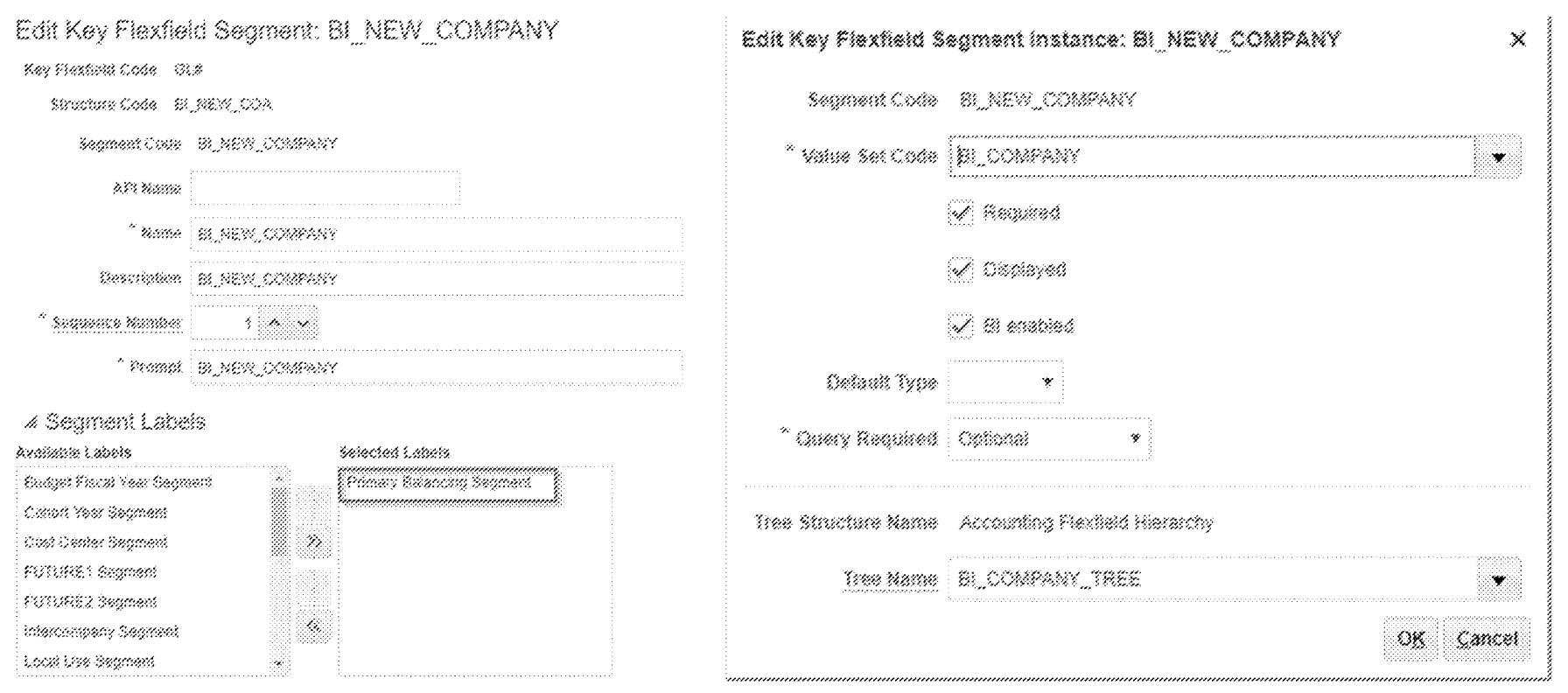

FIG. 14 shows an interface for editing key flex field segments of a GL Accounting KFF, in accordance with an embodiment.

In accordance with an embodiment, the 3 segments mentioned above (i.e., cost center, company (Primary balancing segment label) and natural accounts) if flagged as required will be qualified and hence the VO (view objects_names are known in advance. Examples of these names are as follows:
FscmTopModelAM.AccountBIAM.FLEX_TREE_VS_FA_COST_CTR_VI
FscmTopModelAM.AccountBIAM.FLEX_TREE-CODE_VS_FA_COST_CTR_VI
FscmTopModelAM.AccountBIAM.FLEX_TREE_VS_GL_BALANCING_VI
FscmTopModelAM.AccountBIAM.FLEX_TREE-CODE_VS_GL_BALANCING_VI FscmTopModelAM.AccountBIAM.FLEX_TREE_VS_GL_ACCOUNT_VI
FscmTopModelAM.AccountBIAM.FLEX_TREE-CODE_VS_GL_ACCOUNT_VI In accordance with an embodiment, additional segments that are configured by customers, however, will have VO's (view objects) that are generated dynamically. For each segment associated with trees, two value objects are generated (Tree and TreeCode) with the following naming structure:

FscmTopModelAM.AccountBIAM.FLEX_TREE_VS_<Segment_Label>_VI
FscmTopModelAM.AccountBIAM.FLEX_TREE-CODE_VS_<Segment_Label>_VI In accordance with an embodiment, for each segment without trees, one view object is generated with the following naming structure:

FscmTopModelAM.AccountBIAM.FLEX_VS_<Segment_Label>_VI

Additionally, in accordance with an embodiment, the following VO stores all data related to value sets for each of the GL Account Segments:

FscmTopModelAM.AnalyticsServiceAM.ValueSet-TypedValuesPVO

Figure 15:
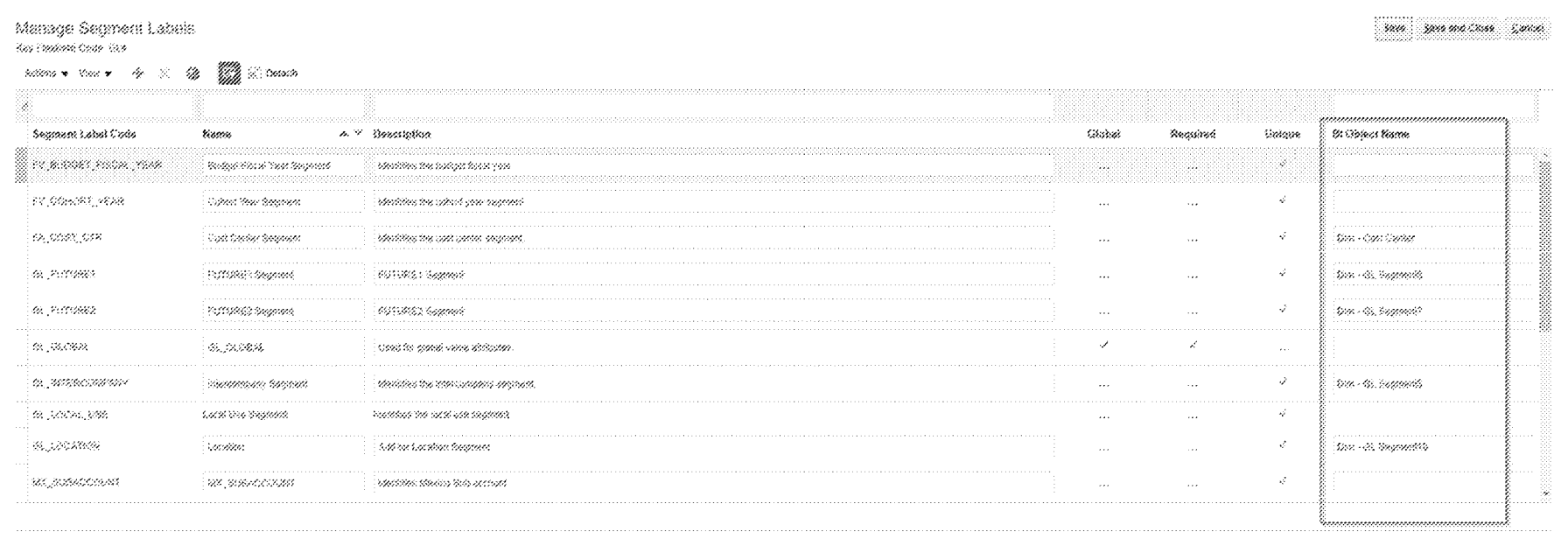

In accordance with an embodiment, a setup configurator can map each of the segment codes (both qualified segments and non-qualified, custom segments) that will be extracted to a dimension in a data warehouse. A user interface for such mapping, in accordance with an embodiment, is shown in FIG. 15. FIG. 15 shows an exemplary interface for managing segment mappings, in accordance with an embodiment.

In accordance with an embodiment, the mapping data (e.g., as shown created in FIG. 15) can be stored in a VO (referred to herein as the VLPVO):

AnalyticsServiceAM.KeyFlexSegmentLabelsVLPVO

In accordance with an embodiment, a SQL query can be used to retrieve flex codes (e.g., GL #), segment label codes, segment names, segment descriptions, and warehouse dimension names from the VLPVO. The retrieved segment label code can be used in the ETL process. The segment label code can be extracted as it exists in the source environment during, e.g., a Chart of Accounts setup and can be used for segment numbering in the warehouse environment. Listing 3 shows an exemplary SQL query for retrieving the segment label codes and other data from the VLPVO.

Listing 3

```
select_physical
  A.KeyFlexfieldCode Flex_CODE, A.SegmentLabelCode Seg_Label_Code,
  A.Name Segment_Name, A.Description Segment_Descr, A.BiObjectName
  BI_Dim_Name
from
  "oracle.apps.fscm.model.analytics.applicationModule.FscmTopModelAM_FscmT
  opModelAMLocal"..."FscmTopModelAM.AnalyticsServiceAM.KeyFlexSegmentLa
  belsVLPVO" A
where
  A.KeyFlexfieldCode = 'GL_#'
```

In accordance with an embodiment, segment to value set mapping metadata can be extracted from source (transactional) tables. This source extract data can be used in a SDS schema. Listing 2 shows an exemplary SQL query for retrieving value set mapping metadata.

Listing 4

```
SELECT DISTINCT
  lbl.key_flexfield_code, lbl.segment_label_code, lbl_name.name segment_label_name,
  lbl.bi_object_name, segi.segment_code, segi.value_set_id
FROM
  fnd_kf_segment_labels_b lbl, fnd_kf_segment_labels_tl lbl_name,
  FND_KF_LABELED_SEGMENTS lbs, fnd_kf_str_instances_b stri,
  FND_KF_SEGMENT_INSTANCES segi
WHERE
  1=1
  AND lbl.key_flexfield_code = 'GL_#' AND lbl.bi_object_name IS NOT NULL
  AND lbl.segment_label_code = lbs.segment_label_code
  AND lbl.segment_label_code = lbl_name.segment_label_code AND
  lbl_name.source_lang = 'US'
  AND lbs.structure_id = stri.structure_id
  AND stri.structure_instance_id = segi.structure_instance_id and stri.key_flexfield_code =
  'GL_#' AND stri.structure_instance_id = 620
ORDER BY 2,3,4
```

In accordance with an embodiment, the value set for these segments can be stored in a view object, such as FscmTopModelAM.AnalyticsServiceAM.ValueSetTypedValuesPVO, which, in the above exemplary SQL statement, extracts from the source transactional tables FND_VS_VALUES_B and FND_VS_VALUE_SETS. Segment labels VLPVO contains Segment value numbers and Segment Label Name and Segment Code for the non-qualified as well as qualified GL segments. Data for the warehouse can be populated as shown in Table 4, which shows exemplary segment-to-value sets mappings.

TABLE 4

| Segment Label Code | Segment Label Name | BI Segment Number | Value Set Code | Value Set Name |
|---|---|---|---|---|
| GL_LOC | Location | Dim-SEGMENT5 | LOC1_VAL_SET | Loc1 Val Set ABC Inc |
| GL_LOC | Location | Dim-SEGMENT5 | LOC2_VAL_SET | Loc2 Val Set ABC Inc |
| GL_SUBACCT | Sub product | Dim-SEGMENT2 | TV_VAL_SET | TV Parts |
| GL_SUBACCT | Sub product | Dim-SEGMENT2 | STB_VAL_SET | STB Parts |
| GL_SUBACCT | Sub product | Dim-SEGMENT2 | MISC_VAL_SET | Misc Parts |
| GL_MANAGEMENT_SEG | Management Segment | Dim-SEGMENT1 | MGMT1 | Management 1 LOV |
| GL_MANAGEMENT_SEG | Management Segment | Dim-SEGMENT1 | MGMT2 | Management 2 LOV |

In accordance with an embodiment, this entity can be used in association (e.g., a physical join) with each GL Segment Dimension, which contains Value Set Code and Values. Value set codes can be comprised of, for example, a bucket, and value sets and values are raw data. Hence, a stripe filter can be used based in Segment Number column from above to identify each non-qualified segment dimension as well as Segment Name.

In accordance with an embodiment, the systems and methods can extract data from an ADF (application development framework) to get a segment label and valueset as a flattened list.

Figure 16:
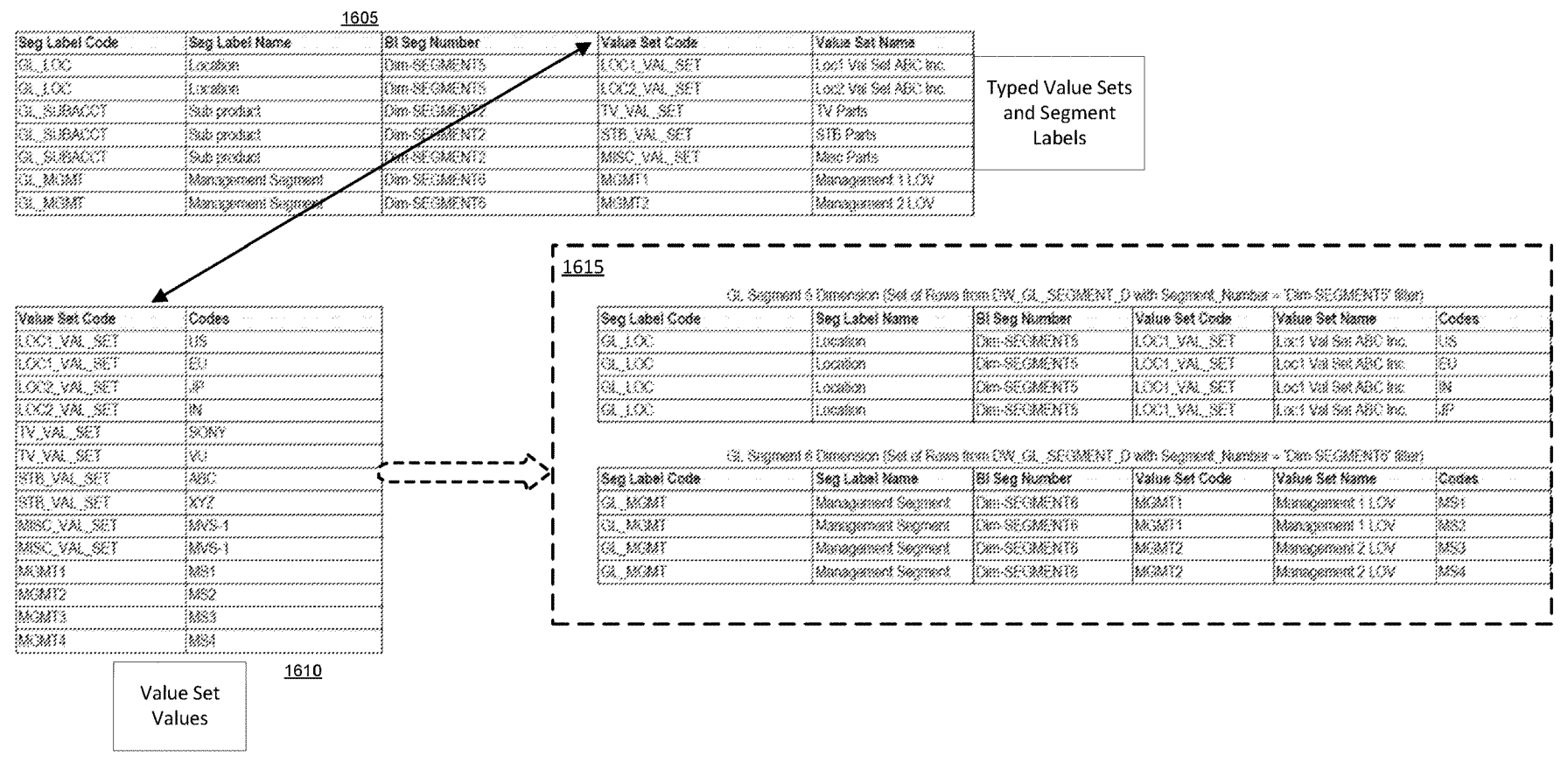

FIG. 16 shows an example of a table derived with a correct grain, in accordance with an embodiment.

In accordance with an embodiment, as shown in FIG. 16, the table 1615 derived from tables 1605 and 1610 is an example of a GL segment dimension in correct grain with mandatory columns.

Figure 17:
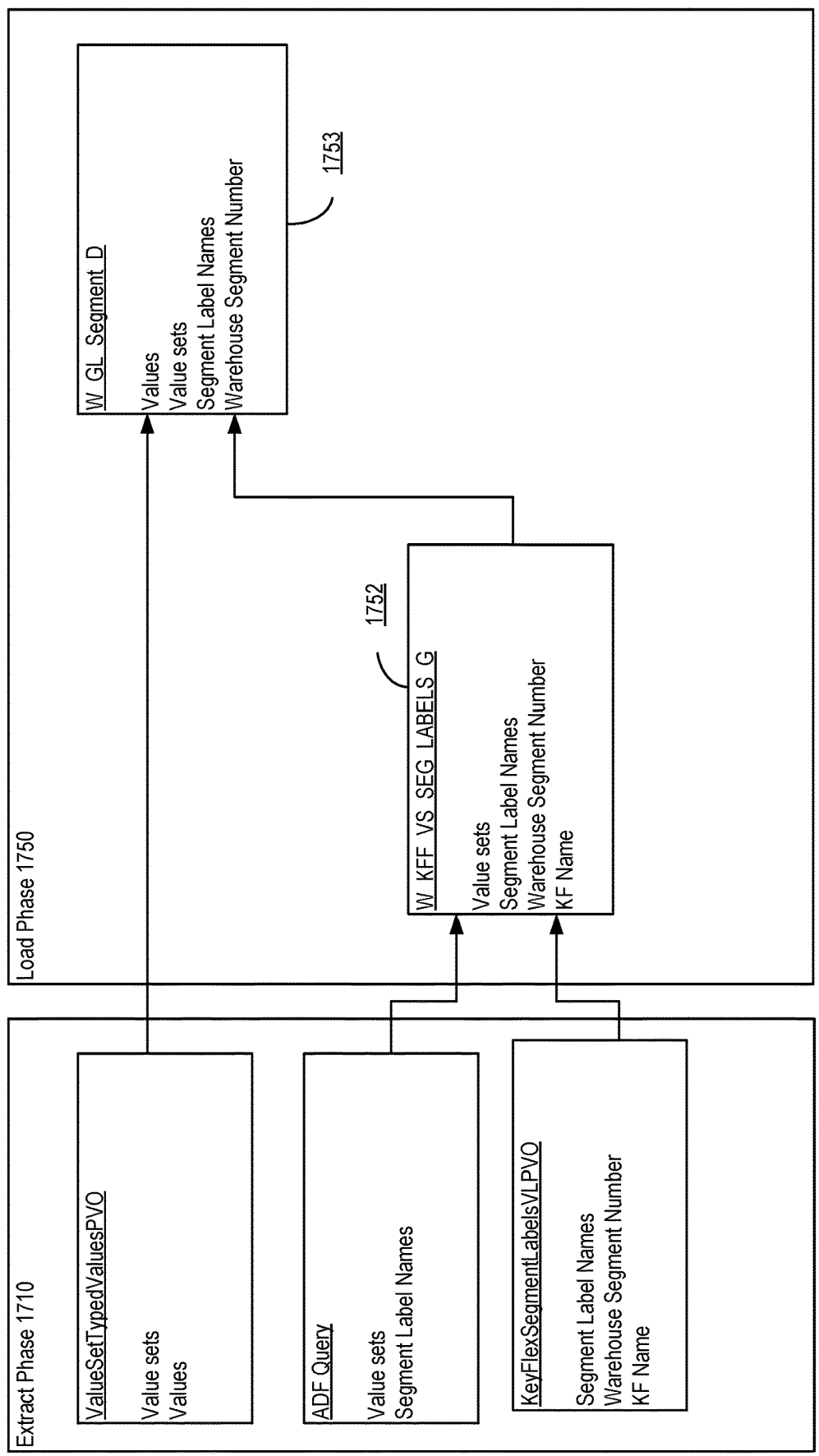
FIG. 17 illustrates a data flow for the use of key flex fields in an analytic applications environment, in accordance with an embodiment.

FIG. 17 illustrates a data flow for the use of key flex fields in an analytic applications environment, in accordance with an embodiment.

In the extract phase 1710, ValueSetTypedValuesPVO represents data in the form of value sets and values. ADF_Query includes metadata that describes which particular segment label is mapped to what value sets. KeyFlexSegmentLabelsVLPVO includes metadata that describes the meaning of the segment label in the context of a particular segment number. In the loading phase 1750, the ADF_Query table can be joined with the KeyFlexSegmentLabelsVLPVO to form the W_KFF_VS_SEG_LABELS_G table 1752. Additionally, the W_KFF_VS_SEG_LABELS_G table can be joined with the ValueSetTypedValuesPVO table to form the W_GL_Segment_D 1753. In accordance with an embodiment, the W_GL_Segment_D table can be the output of the data flow.

In accordance with an embodiment, the output table W_GL_Segment_D can contain the values and the value sets, the segment label names, and the warehouse segment number. This data can be used to qualify each segment with a consistent name for reporting purposes. Because the metadata and the data are presented in a readily consumable format, each segment, segment number and segment label can be identified, and used dynamically to create reports for multiple customers.

In accordance with an embodiment, mapping data that is contained in the output table W_GL_Segment_D can be stored both at the analytic applications schema as well as the customer schema. However, actual data extracted from the source during the extract phase 1710 will only be stored in the customer schema, so as to retain customer confidentiality in data.

Figure 18:
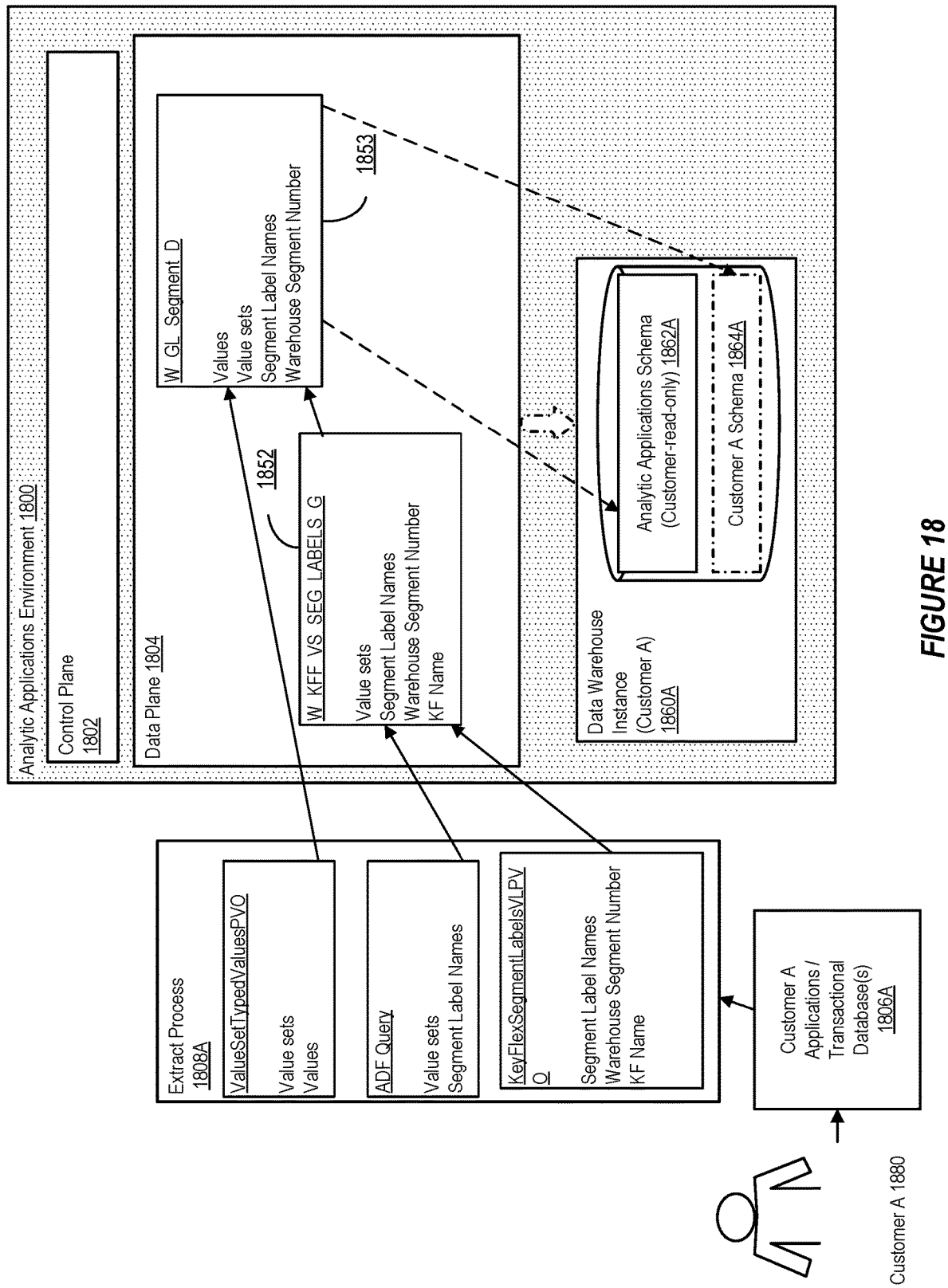
FIG. 18 illustrates a system for key flex fields in an analytic applications environment, in accordance with an embodiment.

FIG. 18 illustrates a system for key flex fields in an analytic applications environment, in accordance with an embodiment.

As illustrated in FIG. 18, which illustrates the operation of the system a number of tenants (customers) in accordance with an embodiment. While only one tenant/customer is shown in FIG. 18, one of ordinary skill in the art would appreciate that more tenants can be added, as described above. Data can be sourced, e.g., from each customer's (tenant's) enterprise software application or data environment 1806A. On extraction 1808A, a key flex field mapping can be utilized in order to successfully map data stored via key flex fields at the customer database 1806A to the customer schema 1864A. ValueSetTypedValuesPVO represents data in the form of value sets and values. ADF_Query includes metadata that describes which particular segment label is mapped to what value sets. KeyFlexSegmentLabelsVLPVO includes metadata that describes the meaning of the segment label in the context of a particular segment number.

In accordance with an embodiment, at the data place 1804, in a loading phase, the ADF_Query table can be joined with the KeyFlexSegmentLabelsVLPVO to form the W_KFF_VS_SEG_LABELS_G table 1852. Additionally, the W_KFF_VS_SEG_LABELS_G table can be joined with the ValueSetTypedValuesPVO table to form the W_GL_Segment_D 1853. In accordance with an embodiment, the W_GL_Segment_D table can be the output of the data flow.

In accordance with an embodiment, the output table W_GL_Segment_D can contain the values and the value sets, the segment label names, and the warehouse segment number. This data can be used to qualify each segment with a consistent name for reporting purposes. Because the metadata and the data are presented in a readily consumable format, each segment, segment number and segment label can be identified, and used dynamically to create reports for multiple customers.

In accordance with an embodiment, in accordance with an embodiment, this WL_GL_Segment_D KFF mapping 1853 can be used to store customer data successfully at the customer schema 1864A, and the mapping itself can be stored at both the analytic applications schema 1862A as well as at the customer schema.

As described above, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases.

Figure 19:
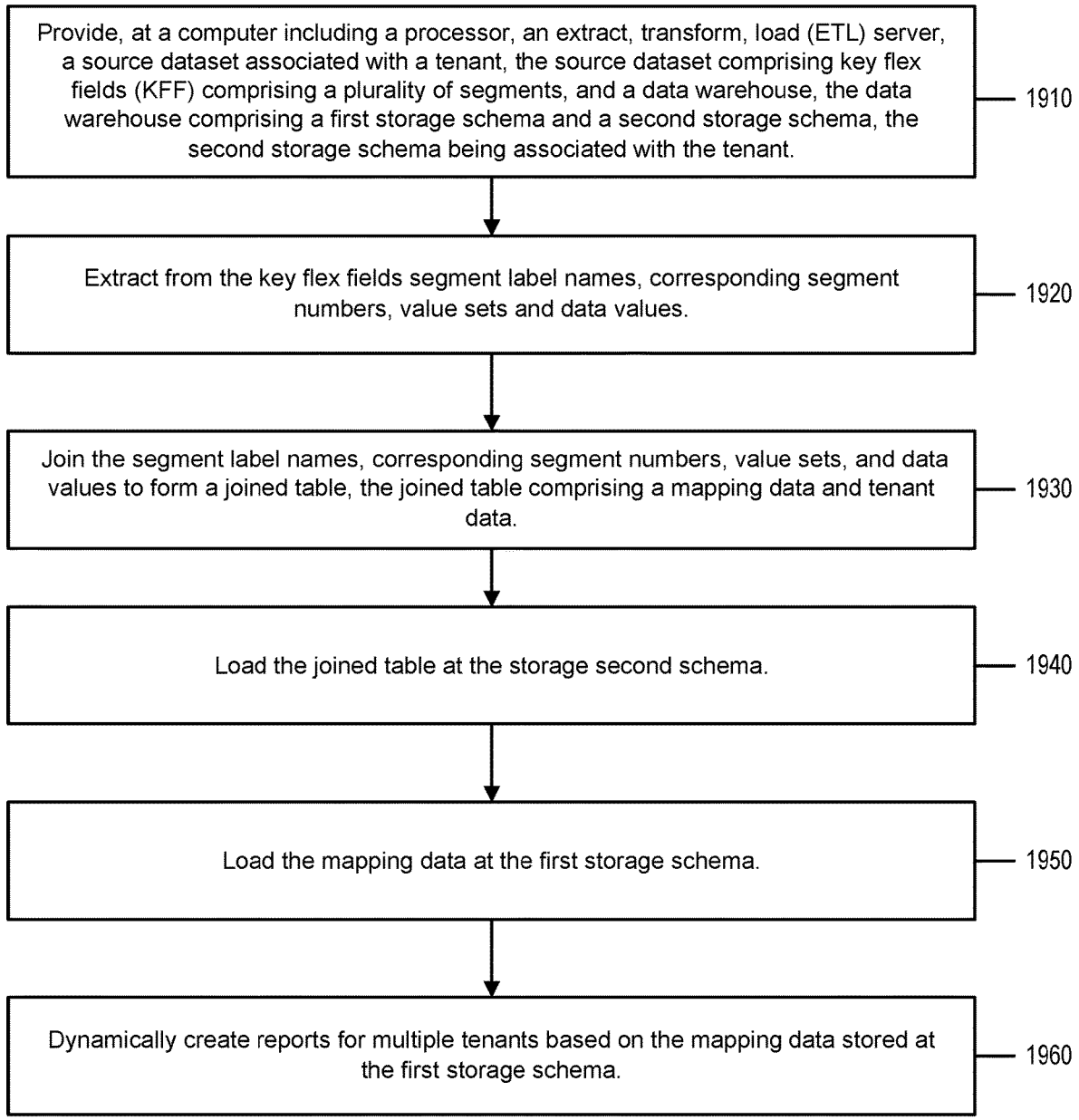
FIG. 19 is a flowchart of a method for supporting the use of key flex field in analytics application environment, in accordance with an embodiment.

FIG. 19 is a flowchart of a method for supporting the use of key flex field in analytics application environment, in accordance with an embodiment.

In accordance with an embodiment, at step 1910, the method can provide, at a computer including a processor, an extract, transform, load (ETL) server, a source dataset associated with a tenant, the source dataset comprising key flex fields (KFF) comprising a plurality of segments, and a data warehouse, the data warehouse comprising a first storage schema and a second storage schema, the second storage schema being associated with the tenant.

In accordance with an embodiment, at step 1920, the method can extract from the key flex fields segment label names, corresponding segment numbers, value sets and data values.

In accordance with an embodiment, at step 1930, the method can join the segment label names, corresponding segment numbers, value sets, and data values to form a joined table, the joined table comprising a mapping data and tenant data.

In accordance with an embodiment, at step 1940, the method can load the joined table at the storage second schema.

In accordance with an embodiment, at step 1950, the method can load the mapping data at the first storage schema.

In accordance with an embodiment, at step 1960, the method can dynamically create reports for multiple tenants based on the mapping data stored at the first storage schema.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytic applications environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for supporting the use of key flex field in analytics application environment, comprising:
    a computer including a processor;
    a source dataset associated with a tenant, the source dataset comprising key flex fields of the first tenant comprising a plurality of segments associated with the tenant;
    a second source dataset associated with a second tenant, the second source data comprising key flex fields of the second tenant comprising a plurality of segments associated with the second tenant; and
    a data warehouse, the data warehouse comprising a first storage schema shareable by multiple tenants, a second storage schema being associated with the tenant, and a third storage schema being associated with the second tenant;
    wherein segment label names, and corresponding value sets and data values are extracted from the key flex fields of the first tenant and the key flex fields of the second tenant by the processor;
    wherein the segment label names, and corresponding value sets, and data values extracted from the key flex fields of the first tenant are joined to form a first joined table by the processor, the first joined table comprising a mapping data and tenant data of the first tenant, wherein the segment label names, and corresponding value sets, and data values extracted from the key flex fields of the second tenant are joined to form a second joined table by the processor, the second joined table comprising the mapping data and tenant data of the second tenant, wherein the mapping data is based at least in part on a context of the key flex fields corresponding to each of the multiple tenants;
    wherein the mapping data is loaded at the first storage schema by the processor;
    wherein the first joined table is loaded at the second storage second schema associated with the first by the processor;
    wherein the second joined table is loaded at the third storage schema associated with the second tenant by the processor;

wherein reports associated with the first tenant and the source dataset are dynamically created based on the mapping data stored at the first storage schema by the processor; and wherein reports associated with the second tenant and the second source dataset are dynamically created based on the mapping data stored at the first storage schema by the processor.

2. The system of claim 1,
wherein the source dataset comprises a source data model; and
wherein the mapping of a transformation format file is further constructed based upon the source data model.

3. The system of claim 1,
wherein a load sequence is defined by a transformation format file.

4. The system of claim 3,
wherein the transformation format file is updated based upon one or more received inputs.

5. The system of claim 4,
wherein the one or more received user inputs are in a human readable format.

6. The system of claim 1,
wherein the mapping data is additionally stored at an analytic applications scheme for later use.

7. A method for supporting the use of key flex field in analytics application environment, comprising:
providing, at a computer including a processor:
a source dataset associated with a tenant, the source dataset comprising key flex fields (KFF) of the first tenant comprising a plurality of segments associated with the tenant,
a second source dataset associated with a second tenant, the second source data comprising key flex fields of the second tenant comprising a plurality of segments associated with the second tenant, and
a data warehouse, the data warehouse comprising a first storage schema shareable by multiple tenants, a second storage schema being associated with the tenant, and a third storage schema being associated with the second tenant;
wherein segment label names, and corresponding value sets and data values are extracted from the key flex fields of the first tenant and the key flex fields of the second tenant by the processor;
wherein the segment label names, and corresponding value sets, and data values extracted from the key flex fields of the first tenant are joined to form a first joined table by the processor, the first joined table comprising a mapping data and tenant data of the first tenant, wherein the segment label names, and corresponding value sets, and data values extracted from the key flex fields of the second tenant are joined to form a second joined table by the processor, the second joined table comprising the mapping data and tenant data of the second tenant, wherein the mapping data is based at least in part on a context of the key flex fields corresponding to each of the multiple tenants;
wherein the mapping data is loaded at the first storage schema by the processor;
wherein the first joined table is loaded at the second storage second schema associated with the first by the processor; and
wherein the second joined table is loaded at the third storage schema associated with the second tenant by the processor;

wherein reports associated with the first tenant and the source dataset are dynamically created based on the mapping data stored at the first storage schema by the processor; and wherein reports associated with the second tenant and the second source dataset are dynamically created based on the mapping data stored at the first storage schema by the processor.

8. The method of claim 7,
wherein the source dataset comprises a source data model; and
wherein the mapping of a transformation format file is further constructed based upon the source data model.

9. The method of claim 7,
wherein a load sequence is defined by a transformation format file.

10. The method of claim 9,
wherein the transformation format file is updated based upon one or more received inputs.

11. The method of claim 9,
wherein the one or more received user inputs are in a human readable format.

12. A non-transitory computer readable storage medium having instructions thereon for providing a universal format driven data transformation in an analytics application environment, which when read and executed cause a computer to perform steps comprising:
providing, at a computer including a processor:
a source dataset associated with a tenant, the source dataset comprising key flex fields (KFF) of the first tenant comprising a plurality of segments associated with the tenant,
a second source dataset associated with a second tenant, the second source data comprising key flex fields of the second tenant comprising a plurality of segments associated with the second tenant, and
a data warehouse, the data warehouse comprising a first storage schema shareable by multiple tenants, a second storage schema being associated with the tenant, and a third storage schema being associated with the second tenant;
wherein segment label names, and corresponding value sets and data values are extracted from the key flex fields of the first tenant and the key flex fields of the second tenant by the processor;
wherein the segment label names, and corresponding value sets, and data values extracted from the key flex fields of the first tenant are joined to form a first joined table by the processor, the first joined table comprising a mapping data and tenant data of the first tenant, wherein the segment label names, and corresponding value sets, and data values extracted from the key flex fields of the second tenant are joined to form a second joined table by the processor, the second joined table comprising the mapping data and tenant data of the second tenant, wherein the mapping data is based at least in part on a context of the key flex fields corresponding to each of the multiple tenants;
wherein the mapping data is loaded at the first storage schema by the processor;
wherein the first joined table is loaded at the second storage second schema associated with the first by the processor; and
wherein the second joined table is loaded at the third storage schema associated with the second tenant by the processor;

wherein reports associated with the first tenant and the source dataset are dynamically created based on the mapping data stored at the first storage schema by the processor; and wherein reports associated with the second tenant and the second source dataset are dynamically created based on the mapping data stored at the first storage schema by the processor.

13. The non-transitory computer readable storage medium of claim 12, wherein the source dataset comprises a source data model; and wherein the mapping of a transformation format file is further constructed based upon the source data model.

14. The non-transitory computer readable storage medium of claim 12, wherein a load sequence is defined by a transformation format file.

15. The non-transitory computer readable storage medium of claim 14, wherein the transformation format file is updated based upon one or more received inputs.

16. The non-transitory computer readable storage medium of claim 15, wherein the one or more received user inputs are in a human readable format.

* * * * *

UNITED STATES PATENT AND TRADEMARK OFFICE
CERTIFICATE OF CORRECTION

PATENT NO. : 12,067,025 B2
APPLICATION NO. : 17/855933
DATED : August 20, 2024
INVENTOR(S) : Chowdhury et al.

Page 1 of 1

It is certified that error appears in the above-identified patent and that said Letters Patent is hereby corrected as shown below:

In the Specification

In Column 5, Line 27, delete "organization," and insert -- organization. --, therefor.

In Column 10, Line 60, delete "analytics" and insert -- analytics. --, therefor.

In Column 13, Line 46, delete "IADVV)" and insert -- IADW) --, therefor.

In Column 17, Line 35, delete "Distinct Flag:'" and insert -- 'Distinct Flag:' --, therefor.

In Columns 23-24 (Listing 2), Line 5, delete "CURRENCY$')" and insert -- CURRENCY$' --.

In Column 26, Line 14, delete "GL #)." and insert -- GL#). --, therefor.

In Column 28, Line 15, delete "GL #)," and insert -- GL#), --, therefor.

In the Claims

In Column 34, Line 21, in Claim 11, delete "claim 9," and insert -- claim 10, --, therefor.

Signed and Sealed this
Twenty-fifth Day of February, 2025

Coke Morgan Stewart
*Acting Director of the United States Patent and Trademark Office*